(12) United States Patent
Yamamoto et al.

(10) Patent No.: US 11,314,233 B2
(45) Date of Patent: Apr. 26, 2022

(54) CONTROLLER FOR MACHINE TOOL, MACHINE TOOL, AND METHOD FOR CONTROLLING MACHINE TOOL

(71) Applicant: Yamazaki Mazak Corporation, Niwa-gun (JP)

(72) Inventors: Hiromasa Yamamoto, Niwa-gun (JP); Tatsuya Matsuda, Niwa-gun (JP); Jumpei Kitayama, Niwa-gun (JP); Kento Yoshida, Niwa-gun (JP); Masatoshi Itoh, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 17/074,628

(22) Filed: Oct. 20, 2020

(65) Prior Publication Data

US 2021/0034040 A1 Feb. 4, 2021

Related U.S. Application Data

(63) Continuation of application No. PCT/JP2018/027302, filed on Jul. 20, 2018.

(51) Int. Cl.
*G05B 19/4155* (2006.01)
*B23Q 15/12* (2006.01)

(52) U.S. Cl.
CPC ......... *G05B 19/4155* (2013.01); *B23Q 15/12* (2013.01); *G05B 2219/35519* (2013.01)

(58) Field of Classification Search
None
See application file for complete search history.

(56) References Cited

U.S. PATENT DOCUMENTS

| 6,004,017 A | 12/1999 | Madhavan |
| 2010/0010662 A1 | 1/2010 | Inagaki |
| 2011/0135415 A1 | 6/2011 | Hamaguchi et al. |
| 2012/0065766 A1 | 3/2012 | Yoshino et al. |

(Continued)

FOREIGN PATENT DOCUMENTS

| CN | 101623835 | 1/2010 |
| CN | 102029546 | 4/2011 |

(Continued)

OTHER PUBLICATIONS

European Office Action for corresponding EP Application No. 18926694.3-1205, dated May 27, 2021.
International Search Report for corresponding International Application No. PCT/JP2018/027302, dated Oct. 16, 2018.

(Continued)

*Primary Examiner* — Ryan A Jarrett
(74) *Attorney, Agent, or Firm* — Mori & Ward, LLP

(57) ABSTRACT

A controller includes a determination circuit, a setting circuit, and a control circuit. The determination circuit is configured to determine whether a chatter vibration is occurring while a spindle is rotating and a workpiece is being cut. The setting circuit is configured to set an upper limit and a lower limit on a change amount of a rotational speed of the spindle. The control circuit is configured to determine the change amount randomly from a range between the upper limit and the lower limit and configured to rotate the spindle at a second rotational speed obtained by changing a first rotational speed by the change amount that has been determined if the chatter vibration is determined as occurring while the control circuit controls the rotational speed of the spindle at the first rotational speed.

20 Claims, 16 Drawing Sheets

(56) References Cited

U.S. PATENT DOCUMENTS

| | | |
|---|---|---|
| 2012/0093603 A1 | 4/2012 | Ueno |
| 2012/0101624 A1 | 4/2012 | Ueno |
| 2014/0121817 A1 | 5/2014 | Nishimura et al. |

FOREIGN PATENT DOCUMENTS

| | | |
|---|---|---|
| CN | 102407490 | 4/2012 |
| CN | 102554685 | 7/2012 |
| CN | 102554692 | 7/2012 |
| CN | 103785905 | 5/2014 |
| DE | 102010023190 | 12/2011 |
| JP | 04-53649 | 2/1992 |
| JP | 2012-200844 | 10/2012 |
| JP | 5631792 B2 | 10/2012 |
| JP | 2017-170600 | 9/2017 |

OTHER PUBLICATIONS

Written Opinion for corresponding International Application No. No. PCT/JP2018/027302, dated Oct. 16, 2018.

European Office Action for corresponding EP Application No. 18926694.3-1205, dated Nov. 26, 2020.

Chinese Office Action for corresponding CN Application No. 201880086328.6, dated Jan. 25, 2021.

Alpay Yilmaz et al., "Machine Tool Chatter Suppression by Multi-Level Random Spindle Speed Variation", Journal of Manufacturing Science and Engineering, May 1, 2002, pp. 208-216, vol. 124, No. 2, XP055729403, US, ISSN: 1087-1357, DOI: 10.1115/1.1378794.

Kong Fansen et al., "Simulation and Experimental Research on Chatter Suppression Using Chaotic Spindle Speed Variation" Journal of Manufacturing Science and Engineering, Feb. 1, 2011, vol. 133, No. 1, XP055729489, US, ISSN: 1087-1357, DOI: 10.1115/1.4003476.

Supplementary European Search report for corresponding EP Application No. 18926694.3-1205, dated Nov. 2, 2020.

FIG. 16

| Cutting tool | Feed rate | Cutting depth | Workpiece material | 1st rotational speed | 2nd rotational speed | Vibration acceleration |
|---|---|---|---|---|---|---|
| CT1 | 8 | 50 | MATERIAL A | 1200 | 1160 | 80 |
| CT1 | 10 | 50 | MATERIAL A | 1650 | 1740 | 75 |
| CT2 | 8 | 30 | MATERIAL B | 500 | 485 | 90 |
| CT2 | 10 | 30 | MATERIAL B | 1000 | 1100 | 110 |
| CT1 | 8 | 50 | MATERIAL B | 700 | 680 | 92 |

620

CONTROLLER FOR MACHINE TOOL, MACHINE TOOL, AND METHOD FOR CONTROLLING MACHINE TOOL

CROSS-REFERENCE TO RELATED APPLICATIONS

The present application is a continuation application of International Application No. PCT/JP2018/027302, filed Jul. 20, 2018. The contents of this application are incorporated herein by reference in their entirety.

BACKGROUND OF THE INVENTION

Field of the Invention

The present invention relates to a controller for a machine tool, a machine tool, and a method for controlling a machine tool.

Discussion of the Background

JP 2012-200844A discloses a machine tool that includes a cutting tool rotatable to cut a workpiece.

SUMMARY OF THE INVENTION

According to one aspect of the present invention, a controller for a machine tool includes determination means, setting means, and control means. The determination means is configured to determine whether a chatter vibration is occurring while a spindle on which a cutting tool or a workpiece is mounted is rotating and the workpiece is being cut. The setting means is configured to set an upper limit and a lower limit on a change amount of a rotational speed of the spindle. The control means is configured to control the rotational speed of the spindle. The control means is configured to determine the change amount randomly from a range between the upper limit and the lower limit and configured to rotate the spindle at a second rotational speed obtained by changing a first rotational speed by the change amount that has been determined if the chatter vibration is determined as occurring while the control means controls the rotational speed of the spindle at the first rotational speed. The control means is configured to repeatedly change the rotational speed until the chatter vibration is determined as not occurring.

According to another aspect of the present invention, a machine tool includes a spindle and the controller.

According to another aspect of the present invention, a controller for a machine tool includes a determination circuit, a setting circuit, and a control circuit. The determination circuit is configured to determine whether a chatter vibration is occurring while a spindle on which a cutting tool or a workpiece is mounted is rotating and the workpiece is being cut. The setting circuit is configured to set an upper limit and a lower limit on a change amount of a rotational speed of the spindle. The control circuit is configured to control the rotational speed of the spindle. The control circuit is configured to determine the change amount randomly from a range between the upper limit and the lower limit and configured to rotate the spindle at a second rotational speed obtained by changing a first rotational speed by the change amount that has been determined if the chatter vibration is determined as occurring while the control circuit controls the rotational speed of the spindle at the first rotational speed. The control circuit is configured to repeatedly change the rotational speed until the chatter vibration is determined as not occurring.

According to the other aspect of the present invention, a method for controlling a machine tool includes rotating, at a first rotational speed, a spindle on which a cutting tool or a workpiece is mounted, and determining whether a chatter vibration is occurring while the spindle is rotating and the workpiece is being cut. An upper limit and a lower limit are set on a change amount of a rotational speed of the spindle. If the chatter vibration is determined as occurring while the spindle is rotating at the first rotational speed, the change amount is determined randomly from a range between the upper limit and the lower limit. The spindle is rotated at a second rotational speed obtained by changing the first rotational speed by the change amount that has been determined. The rotational speed is repeatedly changed until the chatter vibration is determined as not occurring.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 16 illustrates a result list stored in the memory.

DESCRIPTION OF THE EMBODIMENTS

The present invention will now be described with reference to the accompanying drawings, wherein like reference numerals designate corresponding or identical elements throughout the various drawings.

First Embodiment

Figure 1:
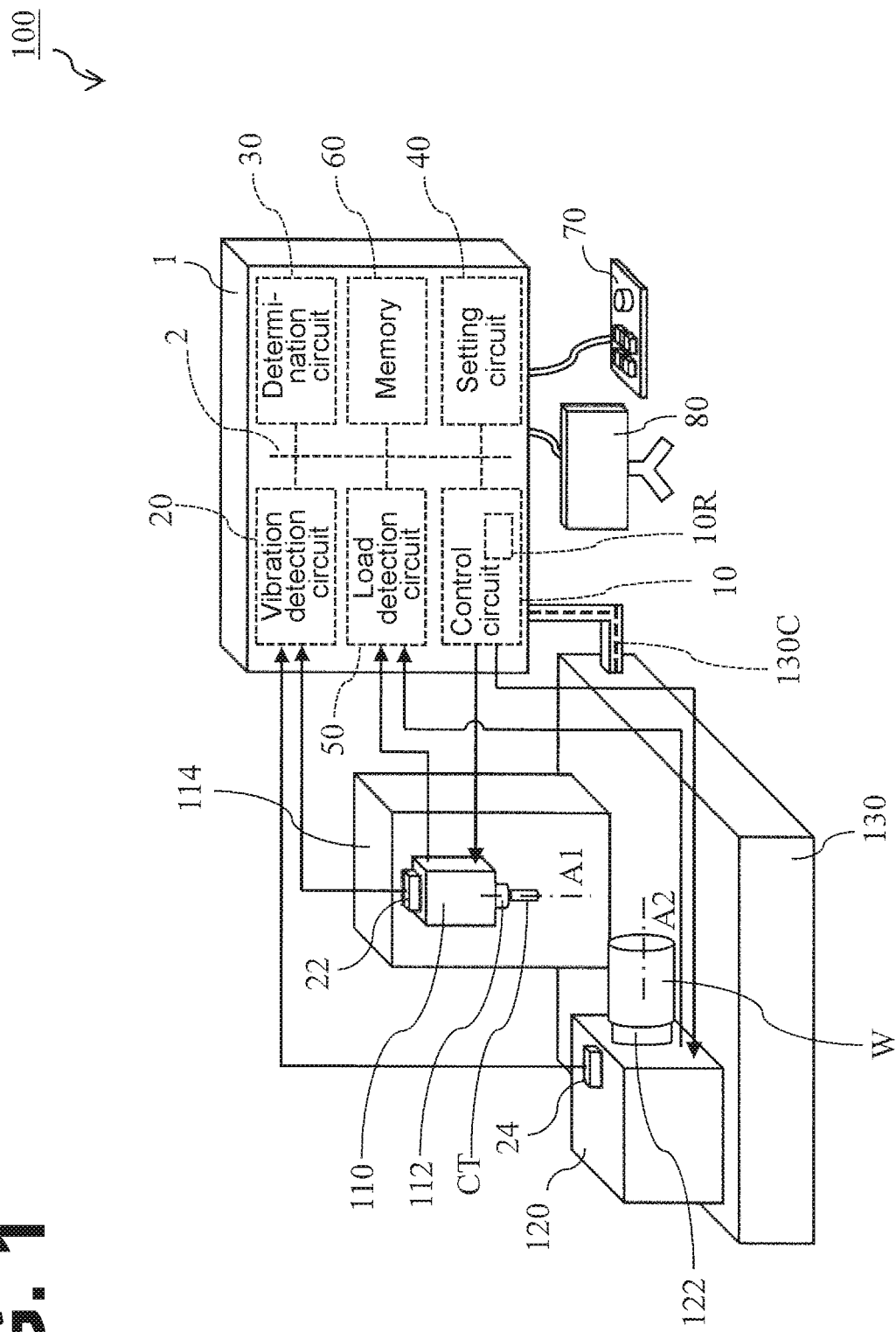
FIG. 1 illustrates a schematic configuration of a machine tool according to a first embodiment.

FIG. 1 illustrates a schematic configuration of a machine tool 100 according to the first embodiment. In FIG. 1, the arrows represent signal flows. As illustrated in FIG. 1, the machine tool 100 includes a tool headstock 110 and a workpiece headstock 120. The tool headstock 110 and the workpiece headstock 120 are mounted on a base 130.

The tool headstock 110 includes a tool spindle 112. The tool spindle 112 is rotatable about a rotation axis A1. The rotation axis A1 is substantially parallel to vertical directions. To the tool spindle 112, a cutting tool CT is attached. The tool headstock 110 is mounted on a column 114, which is mounted on the base 130.

The workpiece headstock 120 includes a workpiece spindle 122. The workpiece spindle 122 is rotatable about a rotation axis A2. The rotation axis A2 is substantially parallel to horizontal directions. To the workpiece spindle 122, a workpiece W is attachable.

While in this embodiment the rotation axis A1 and the rotation axis A2 are substantially orthogonal to each other, the rotation axis A1 and the rotation axis A2 may not necessarily be orthogonal to each other. Also, while in this embodiment the tool spindle 112 and the workpiece spindle 122 are rotatable, only one of the tool spindle 112 and the workpiece spindle 122 may be rotatable.

The column 114 is movable in the horizontal directions. The tool headstock 110 is movable in the vertical directions. This makes the tool spindle 112 movable in the horizontal directions and the vertical directions. The tool headstock 110 may be rotatable relative to the column 114 about an axis substantially orthogonal to the horizontal directions. In this embodiment, the workpiece headstock 120 unmovably holds the workpiece spindle 122. The workpiece headstock 120, however, may movably hold the workpiece spindle 122. Also, the tool spindle 112 may be unmovable while the workpiece spindle 122 may be movable.

This embodiment will be described below with milling taken as an example. In the milling described below, the cutting tool CT rotates relative to the workpiece W about the rotation axis A1.

The machine tool 100 includes a controller 1. The controller 1 controls the machine tool 100. The controller 1 is connected to the base 130. It is to be noted that the controller 1 may be connected to another position on the machine tool 100 or may be provided separately from the base 130. To the controller 1, a manipulator (manipulation means) 70 and a display (display means) 80 are connected. The manipulator 70 and the display 80 constitute a Graphical User Interface. It is to be noted, however, that the controller 1, the manipulator 70, and the display 80 may be integral to each other.

As illustrated in FIG. 1, the controller 1 includes a control circuit (control means) 10, a vibration detection circuit (vibration detection means) 20, a determination circuit (determination means) 30, a setting circuit (setting means) 40, a load detection circuit (load detection means) 50, and a memory (storing means) 60. The control circuit 10, the vibration detection circuit 20, the determination circuit 30, the setting circuit 40, the load detection circuit 50, and the memory 60 are connected to each other through a bus 2 so that signals are transmittable and receivable to and from each other. In this embodiment, the control circuit 10, the vibration detection circuit 20, the determination circuit 30, the setting circuit 40, and the load detection circuit 50 are provided separately from each other. These circuits, however, may be implemented in a single circuit. Instead of the above circuits, the controller 1 may include a program that implements the operations of the circuits; and a processor that executes the program. It is to be noted that the program is stored in the memory 60.

The control circuit 10 controls: the rotation of the tool spindle 112 about the rotation axis A1; the movement of the tool headstock 110; and the movement of the column 114. The control circuit 10 includes an operator that calculates the rotational speed of the tool spindle 112 and the change amount of the rotational speed. In order to control the tool spindle 112, the tool headstock 110, and the column 114, the controller 1 transmits a control signal to them through a cable 130C, which is located between the base 130 and the controller 1. The controller 1 integrally controls the machine tool 100 based on a cutting machining program and/or an input manipulation received at the manipulator 70. The cutting machining program is stored in the memory 60.

The control circuit 10 includes a random number generation circuit (random number generation means) 10R. The random number generation circuit 10R generates a random number. The random number is used to change the rotational speed of the tool spindle 112. In this embodiment, the random number generation circuit 10R generates a uniform random number that ranges from 0 to 1. It is to be noted that the uniform random number may include 0 and 1 or may not necessarily include 0 and 1. The random number generation circuit 10R is a pseudo-random number generation circuit (pseudo-random number generator) that generates a pseudo-random number based on linear congruential generators. An initial value of the pseudo-random number is a random number that is based on time and/or thermal noise.

It is to be noted, however, that the random number generated by the random number generation circuit 10R will not be limited to a uniform random number. Also, the random number generation circuit 10R may generate a pseudo-random number based on another algorithm (for example, Mersenne twister). Also, the initial value of the pseudo-random number will not be limited to a random number that is based on time and/or thermal noise. Further, instead of being a pseudo-random number generation circuit, the random number generation circuit 10R may be a random number generation circuit (random number generator) that is based on, for example, thermal noise.

The vibration detection circuit 20 detects the acceleration of a vibration occurrable the cutting tool CT cuts the workpiece W. The vibration detection circuit 20 is connected to a vibration sensor 22 and a vibration sensor 24. The vibration sensor 22 is mounted on the tool headstock 110. The vibration sensor 24 is mounted on the workpiece headstock 120. In this embodiment, the vibration sensor 22 and the vibration sensor 24 are acceleration sensors. This, however, is not intended in a limiting sense. A driving signal to drive the vibration sensor 22, a driving signal to vibrate the vibration sensor 24, a detection signal output from the vibration sensor 22, and a detection signal output from the vibration sensor 24 are transmitted through the cable 130C. These detection signals each represent the vibration acceleration ($m/s^2$) of a vibration. In response to an acquisition demand from another circuit, the vibration detection circuit 20 drives the vibration sensor 22 and the vibration sensor 24 and AD-converts the detection signals. Then, the vibration detection circuit 20 outputs signals representing AD-converted vibration accelerations.

While in this embodiment two sensors, the vibration sensor 22 and the vibration sensor 24, are provided, only a single vibration sensor may be provided. Also, the vibration sensor 22 and the vibration sensor 24 may be mounted on other than the tool headstock 110 and the workpiece headstock 120, respectively.

The determination circuit 30 determines whether chatter vibrations are occurring in the machine tool 100. Specifically, the determination circuit 30 determines whether a vibration acceleration A, which has been detected, is larger than a vibration threshold (m/s$^2$). When the vibration acceleration A is larger than the vibration threshold, the determination circuit 30 determines that chatter vibrations are occurring in the machine tool 100.

For example, the memory 60 stores the vibration threshold used for the vibration acceleration determination. The determination circuit 30 includes a logic operator that compares the vibration threshold stored in the memory 60 with the vibration acceleration A obtained from the vibration detection circuit 20. It is to be noted, however, that the vibration threshold may be obtained based on an input manipulation received at the manipulator 70. The determination circuit 30 outputs to the control circuit 10 a signal representing the comparison. Specifically, the determination circuit 30 outputs to the control circuit 10 a signal notifying whether chatter vibrations have occurred.

In this embodiment, two sensors, the vibration sensor 22 and the vibration sensor 24, are used. With this configuration, the determination circuit 30 compares the vibration acceleration corresponding to the vibration sensor 22 with the vibration threshold for the vibration sensor 22, and compares the vibration acceleration corresponding to the vibration sensor 24 with the vibration threshold for the vibration sensor 24. In this respect, the determination circuit 30 may determine whether at least one of the vibration accelerations is larger than the corresponding vibration threshold. It is to be noted, however, that the determination circuit 30 may add together the vibration acceleration corresponding to the vibration sensor 22 and the vibration acceleration corresponding to the vibration sensor 24, and compare the sum with a single vibration threshold.

The determination circuit 30 may also include an operator that calculates an effective value $A_{RMS}$ of a vibration acceleration. Specifically, the determination circuit 30 uses the operator to calculate the effective value $A_{RMS}$ based on the following Formula 1.

$$A_{RMS} = \sqrt{\frac{1}{N}\sum_{i=1}^{N} A_i^2} \qquad \text{(Formula 1)}$$

For example, the determination circuit 30 obtains 4000 vibration accelerations, $A_1$ to $A_{4000}$, every 200 msec from the vibration detection circuit 20. Then, the determination circuit 30 compares the effective value $A_{RMS}$ obtained based on Formula 1 with the vibration threshold. Thus, an effective value $A_{RMS}$ of a vibration acceleration is used. This ensures that even if, for example, some vibration accelerations $A_i$ have abnormal values due to the influence of noise on the cable 130C, the effective value $A_{RMS}$ is affected by a larger number of normal values, preventing the abnormal values from causing mal-determinations.

It is to be noted, however, that the vibration acceleration may be other than the effective value $A_{RMS}$, examples including an instantaneous value, a peak value in a predetermined period, and a value obtained by Fourier-analyzing a vibration acceleration in the time domain to convert the vibration acceleration into a vibration acceleration in the frequency domain. It is also possible to use a vibration's power spectrum in a predetermined frequency as a value in place of the vibration acceleration.

Whether chatter vibrations are occurring may be determined not only based on the vibration acceleration but also based on a load on the tool spindle 112. Specifically, the load detection circuit 50 detects a load on the tool spindle 112. For example, the load detection circuit 50 includes a current detecting resistor. The current detecting resistor is electrically connected to a terminal of the motor that rotates the tool spindle 112 about the rotation axis A1. Thus, the current detecting resistor is provided to detect a current value. The current value that has been detected corresponds to the load on the tool spindle 112. Then, the determination circuit 30 determines whether the vibration acceleration that has been detected is larger than a vibration threshold corresponding to the current value that has been detected. When the current value that has been detected is a large value, the cutting that is being performed is determined as deep cutting. Based on the determination, the vibration threshold is set at a relatively large value. When the current value that has been detected is a small value, the cutting that is being performed is determined as light cutting. Based on the determination, the vibration threshold is set at a relatively small value. Under the circumstances, a vibration acceleration that may be determined as normal cutting when the current value is large may be determined as chatter vibrations when the current value is small.

It is to be noted that the relationship between the current value and the vibration threshold may be stored in the memory 60, or may be obtained by receiving an input manipulation at the manipulator 70.

Also, the determination circuit 30 may determine whether chatter vibrations are occurring based on the average of a plurality of current values detected over a predetermined period of time. This manner of determination eliminates or minimizes such a mal-determination that chatter vibrations are erroneously determined as occurring based on a temporarily large current value at a point of time when the cutting tool CT contacts the workpiece W and a point of time when the cutting tool CT moves off the workpiece W.

The determination circuit 30 may also determine, without using the current value and the vibration threshold, that chatter vibrations are occurring when a ratio between the current value and the vibration acceleration is equal to or more than a predetermined threshold.

The determination circuit 30 may also determine, based on sound (for example, sound volume) obtained through a microphone, that chatter vibrations are occurring in the machine tool 100. Further, the determination circuit 30 may determine that chatter vibrations are occurring in the machine tool 100 when the manipulator 70 has received a manipulation indicating that chatter vibrations are occurring.

The setting circuit 40 sets an upper limit UL and a lower limit LL on the change amount of the rotational speed of the tool spindle 112. In response to an acquisition demand from the control circuit 10, the setting circuit 40 outputs a signal representing the upper limit UL and the lower limit LL.

For example, the setting circuit 40 may set the upper limit UL and the lower limit LL based on an input manipulation received at the manipulator 70. It is to be noted, however, that the setting circuit 40 may include an operator that obtains from the control circuit 10 a signal representing the present rotational speed of the tool spindle 112 and that calculates the upper limit UL and the lower limit LL based on the present rotational speed. Also, the operator may obtain a rotational speed input by an input manipulation received at the manipulator 70, and calculate the upper limit UL and the lower limit LL based on the rotational speed that has been input.

The upper limit UL and the lower limit LL may be absolute values (rpm) of the rotational speed, or may be relative values (%) relative to a reference rotational speed. It is also possible to make such a setting that the range between the upper limit UL and the lower limit LL is enlarged as the reference rotational speed increases. This setting may be made using a mathematical formula or a table in or on which the reference rotational speed is correlated with the upper limit UL and the lower limit LL. Further, the upper limit UL and the lower limit LL may be positive absolute values (relative values) or negative absolute values (relative values).

For example, the upper limit UL is set at +100 (rpm), and the lower limit LL is set at −100 (rpm). For further example, the upper limit UL is set at +10% relative to the reference rotational speed, and the lower limit LL is set at −10(%) relative to the reference rotational speed.

It is to be noted that in order to shorten the time for the cutting, the intermediate value between the upper limit UL and the lower limit LL may be larger than 0 (rpm or %). For example, the upper limit UL is set at +200 (rpm), and the lower limit LL is set at −100 (rpm).

The upper limit UL is set such that the post-change rotational speed is less than a highest settable rotational speed. Specifically, the upper limit UL is set such that the sum of the pre-change rotational speed and the upper limit UL is less than the highest rotational speed. The lower limit LL is set such that the post-change rotational speed is larger than a lowest settable rotational speed.

Also, the upper limit UL and the lower limit LL may not necessarily be set based on the reference rotational speed, but may be set based on the cutting tool CT's specifications (for example, teeth number). Further, the upper limit UL and the lower limit LL may be set based on a multi-variable, multi-dimensional polynomial with values representing the present rotational speed, the cutting tool CT's specifications, and other machining conditions included as variables.

Figure 2:
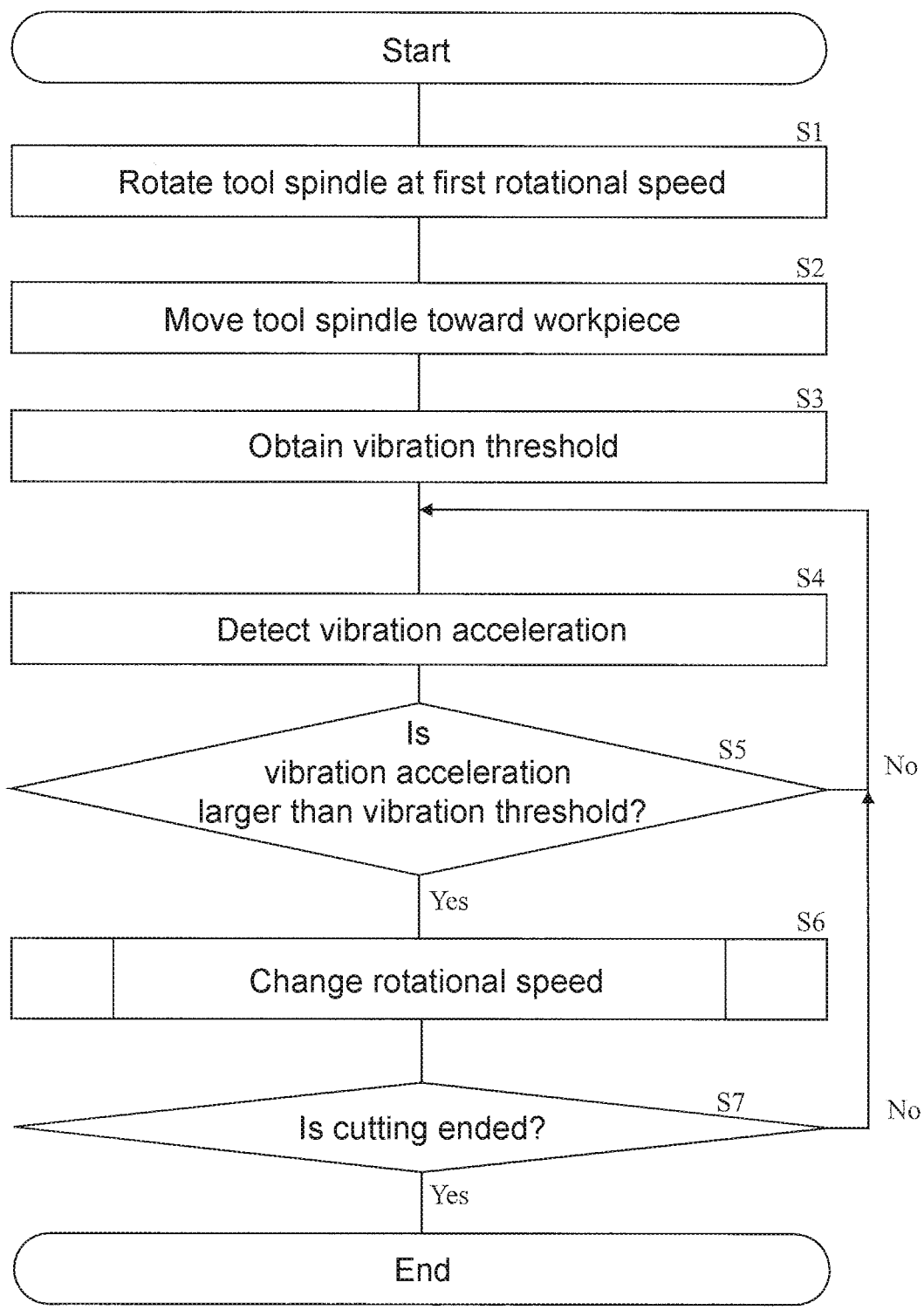
FIG. 2 is a flowchart of operations performed by a controller.
Figure 3:
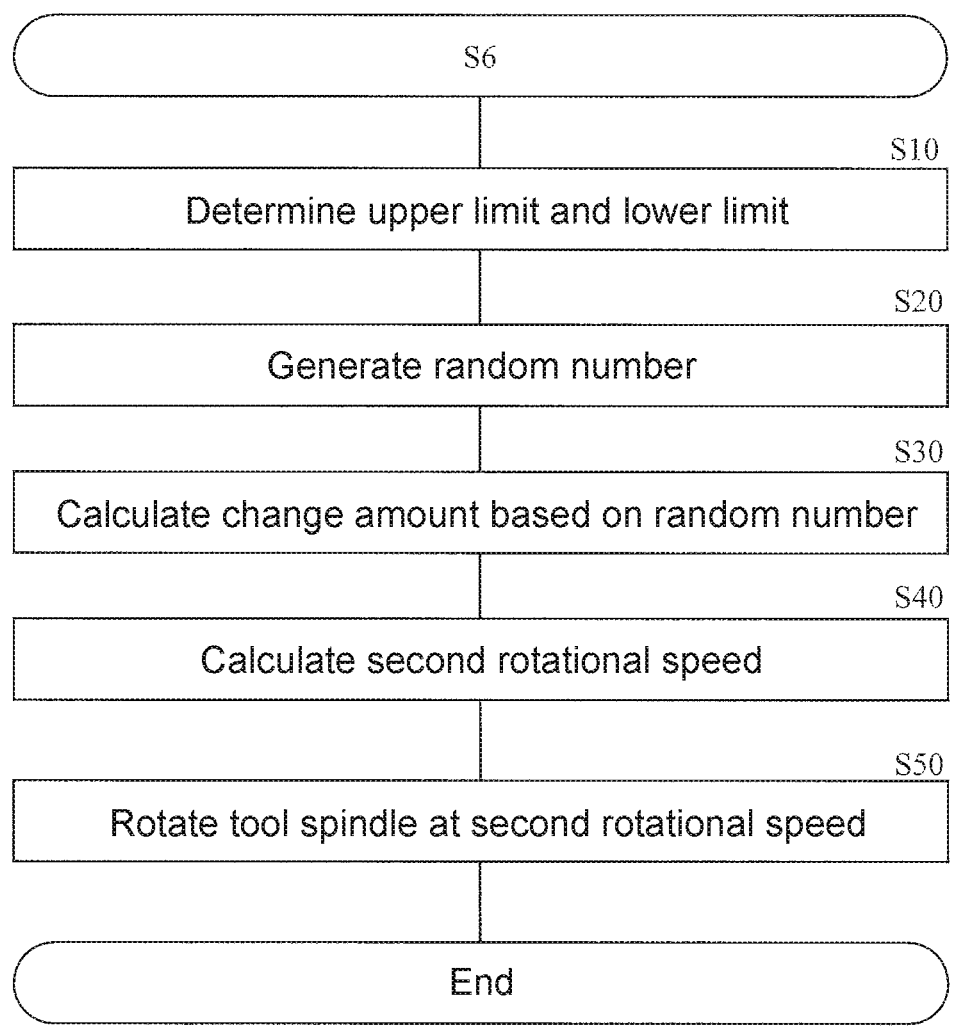
FIG. 3 is a flowchart of operations performed in rotational-speed changing processing.

Next, FIG. 2 is a flowchart of operations performed by the controller 1. FIG. 3 is a flowchart of operations performed in the rotational-speed changing processing.

As illustrated in FIG. 2, the control circuit 10 rotates the tool spindle 112 at a first rotational speed (step S1). Specifically, the control circuit 10 may read the first rotational speed specified in the cutting machining program, or may obtain the first rotational speed based on an input manipulation received at the manipulator 70.

The control circuit 10 controls the tool headstock 110 and the column 114 to move the tool spindle 112 toward the workpiece W (step S2). The determination circuit 30 obtains a vibration threshold (step S3). The vibration detection circuit 20 detects the vibration acceleration of a vibration (step S4). The determination circuit 30 determines whether the vibration acceleration that has been detected is larger than the vibration threshold (step S5). When the vibration acceleration that has been detected is equal to or less than the vibration threshold (step S5: No), the procedure returns to step S4. It is to be noted that as described above, the determination circuit 30 may use a load on the tool spindle 112 at step S5, in addition to the vibration acceleration.

Changing of Rotational Speed

When the vibration acceleration that has been detected is larger than the vibration threshold (step S5: Yes), processing of changing the rotational speed of the tool spindle 112 is performed (step S6). Specifically, when a determination has been made that chatter vibrations are occurring (step S5: Yes), the processing of changing the rotational speed of the tool spindle 112 is performed so as to eliminate or minimize the chatter vibrations (step S6).

As illustrated in FIG. 3, in rotational-speed changing processing S6, the setting circuit 40 sets the upper limit UL and the lower limit LL (step S10). Then, the random number generation circuit 10R of the control circuit 10 generates a random number RN, which ranges from 0 to 1 (step S20). Then, the control circuit 10 calculates the change amount, V, of the rotational speed based on the random number RN that has been generated (step S30). For example, the control circuit 10 calculates the change amount V based on the following Formula 2-1.

$$V=LL+(UL-LL)\times RN \qquad \text{(Formula 2-1)}$$

That is, the change amount V is determined randomly from the range between the upper limit UL and the lower limit LL.

Then, the control circuit 10 calculates a second rotational speed RS2 (step S40). Specifically, the control circuit 10 changes the first rotational speed, RS1, using the change amount V calculated at step S30, thereby calculating the second rotational speed RS2.

For example, when the upper limit UL, the lower limit LL, and the change amount V are absolute values (rpm) of the rotational speed, the control circuit 10 calculates the second rotational speed RS2 based on Formula 2-2.

$$RS2=RS1+V \qquad \text{(Formula 2-2)}$$

That is, the second rotational speed RS2 is the sum of the first rotational speed RS1 and the change amount V.

For example, when the upper limit UL, the lower limit LL, and the change amount V are relative values (%) relative to the first rotational speed RS1, the control circuit 10 calculates the second rotational speed RS2 based on Formula 2-2A.

$$RS2=RS1\times(1+V) \qquad \text{(Formula 2-2A)}$$

That is, when the upper limit UL, the lower limit LL, and the change amount V are relative values (%) relative to the first rotational speed RS1, the range between the upper limit and the lower limit of the absolute value (rpm) of the rotational speed is enlarged as the first rotational speed RS1 increases.

Then, the control circuit 10 rotates the tool spindle 112 about the rotation axis A1 at the second rotational speed RS2 that has been calculated (step S50).

Referring again to FIG. 2, upon ending of the processing of changing the rotational speed of the tool spindle 112 (step S6), the control circuit 10 determines whether the cutting is ended (step S7). For example, the control circuit 10 determines that the cutting is ended when a period of time scheduled in the cutting machining program has passed or when the tool spindle 112 has been conveyed over a scheduled length (step S7: Yes). When the control circuit 10 determines that the cutting is not ended (step S7: No), the procedure returns to step S4.

Conventionally, when chatter vibrations occur in a machine tool, it was necessary to have a skilled person with a fair amount of experience intervene in: a determination as to whether the chatter vibrations are occurring; and/or obtaining machining conditions for eliminating or minimizing the chatter vibrations. In this embodiment, the controller 1 detects a vibration acceleration and determines whether the vibration acceleration that has been detected is larger than the vibration threshold. In this manner, the controller 1 automatically determines whether chatter vibrations are occurring. Further, the controller 1 determines the change amount V randomly from the range between the upper limit UL and the lower limit LL. Then, the controller 1 changes the first rotational speed RS1 by the change amount V that has been determined, thereby obtaining the second rotational speed RS2. This ensures that chatter vibrations occurrable while a machine tool is performing cutting are eliminated or minimized easily without the intervention of a skilled person.

Figure 4:
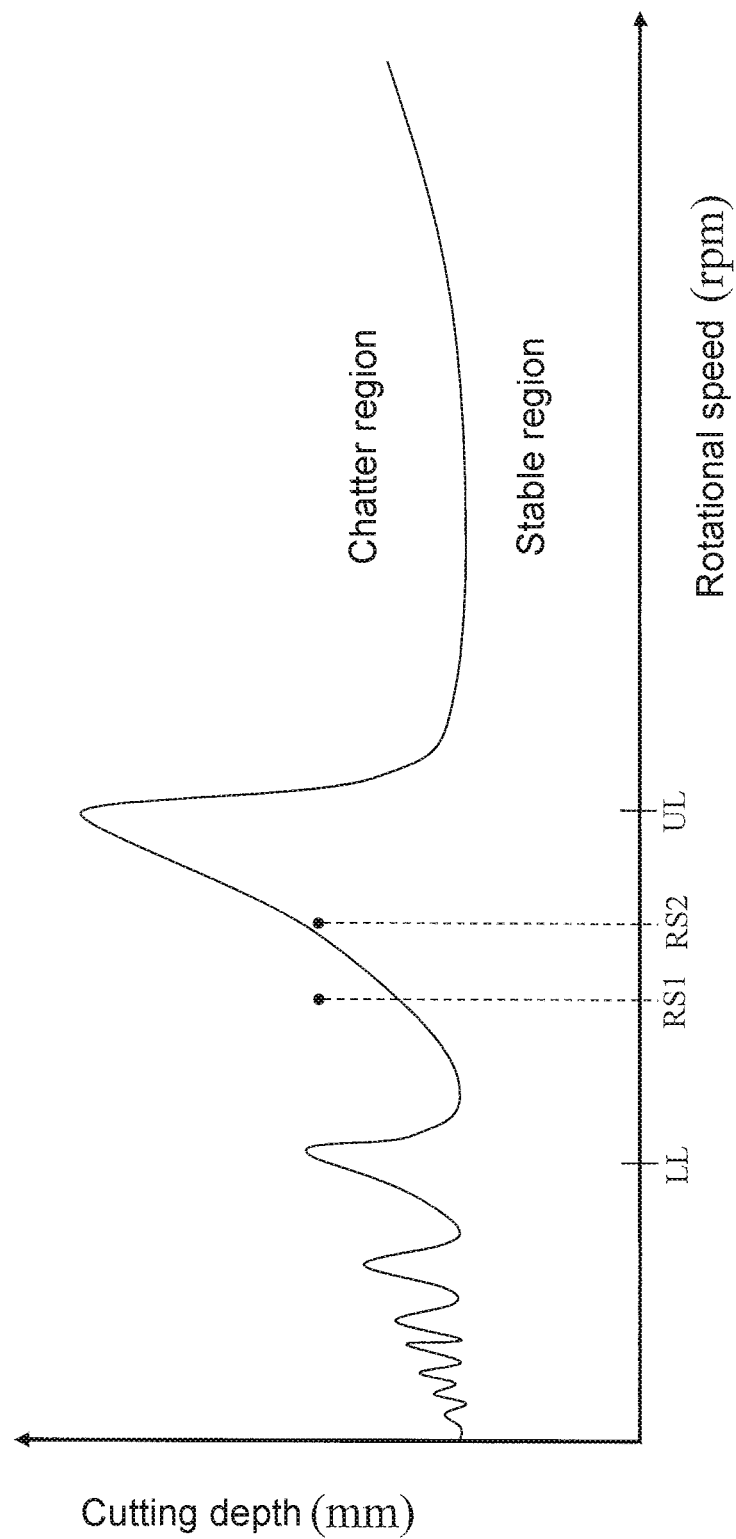
FIG. 4 is a schematic stability lobe diagram for showing effects of the embodiment.

FIG. 4 is a schematic stability lobe diagram for showing effects of this embodiment. The term "stability lobe diagram" refers to a graph showing behaviors of regenerative chatter vibrations that belong to self-excited chatter vibrations in terms of a relationship between the rotational speed of the spindle and the cutting depth of a tool. The lower half region defined by the lobe illustrated in FIG. 4 is a stable region in which machining can be performed without allowing chatter vibrations to occur, and the upper half region defined by the lobe is a chatter region in which chatter vibrations occur. It is to be noted, however, that in this embodiment, the control circuit 10 does not obtain the stability lobe diagram illustrated in FIG. 4.

Conventional practice was to obtain the stability lobe diagram illustrated in FIG. 4 so as to eliminate or minimize regenerative chatter vibrations among self-excited chatter vibrations in cutting. In order to obtain the stability lobe diagram, conventional practice was to perform a vibration test and/or a cutting test on a machine tool. It is, however, difficult to obtain an accurate stability lobe diagram. It is also difficult to grasp all factors of chatter vibrations; even if cutting starts without chatter vibrations based on the stability lobe diagram that has been obtained, chatter vibrations may occur during the cutting.

As clearly seen from FIG. 4, changing the rotational speed of the cutting tool can be used as means for eliminating or minimizing chatter vibrations. In light of this, in this embodiment, the control circuit 10, instead of obtaining a stability lobe diagram, determines the change amount V randomly from the range between the upper limit UL and the lower limit LL, and changes the first rotational speed RS1 by the change amount V that has been determined, thereby obtaining the second rotational speed RS2. Thus, the control circuit 10, instead of obtaining a stability lobe diagram, changes the first rotational speed RS1 of the tool spindle 112 to the second rotational speed RS2, thereby eliminating or minimizing chatter vibrations. This embodiment, therefore, eliminates the need for a vibration test and a cutting test to obtain a stability lobe diagram. Further, the controller 1 need not be provided with calculation capabilities for analyzing vibration test results. Also, chatter vibrations are eliminated or minimized while the machine tool 100 is performing cutting, regardless of whether these chatter vibrations are self-excited type or forced type. In the stability lobe diagram illustrated in FIG. 4, the distance (rotational speed)between adjacent peaks increases as the rotational speed increases. That is, the change amount V preferably increases as the rotational speed increases, in order to reliably eliminate or minimize chatter vibrations. In this embodiment, the upper limit UL and the lower limit LL are set as relative values (%) relative to the first rotational speed RS1, or a mathematical formula or a table in or on which the first rotational speed RS1 is correlated with the upper limit UL and the lower limit LL is used. This ensures that the range between the upper limit and the lower limit of absolute values (rpm) of the rotational speed is enlarged as the first rotational speed RS1 increases. This makes the change amount V small when the first rotational speed RS1 is small, and makes the change amount V large when the first rotational speed RS1 is large. That is, the change amount V of the rotational speed can be adjusted based on a tendency that a machinable region of a stability lobe diagram has. This ensures that the second rotational speed RS2 obtained more reliably eliminates or minimizes chatter vibrations.

Conventional practice occasionally used machine learning to determine the adjustment amount by which machining conditions are adjusted, in order to eliminate or minimize chatter vibrations. In order to obtain optimal machining conditions by machine learning, however, a complicated calculation procedure is necessary, leaving a large amount of calculation processing load on a control circuit. Also, in order to derive optimal machining conditions, it is necessary to accumulate a large volume of data. When a machine tool deals with production in small quantities and wide varieties, it is difficult to accumulate data of the various tools used for such production and data of workpiece materials and workpiece machining shapes. In this embodiment, the controller 1 determines the change amount V randomly from the range between the upper limit UL and the lower limit LL, and changes the first rotational speed RS1 by the change amount V that has been determined, thereby obtaining the second rotational speed RS2. This makes the calculation procedure simple, reducing the calculation processing load on the control circuit 10. Further, it is not necessary to accumulate a large volume of data. This ensures that chatter vibrations occurrable while the machine tool 100 is performing cutting are eliminated or minimized without reliance on the kind of tool, the material of the workpiece, and the machining shape.

It is to be noted that generating of the random number RN may be omitted. For example, the control circuit 10 may determine, as the change amount V, a median value between the upper limit UL and the lower limit LL. Specifically, the control circuit 10 may determine the change amount V from the range between the upper limit UL and the lower limit LL according to a rule.

Modification 1

Figure 5:
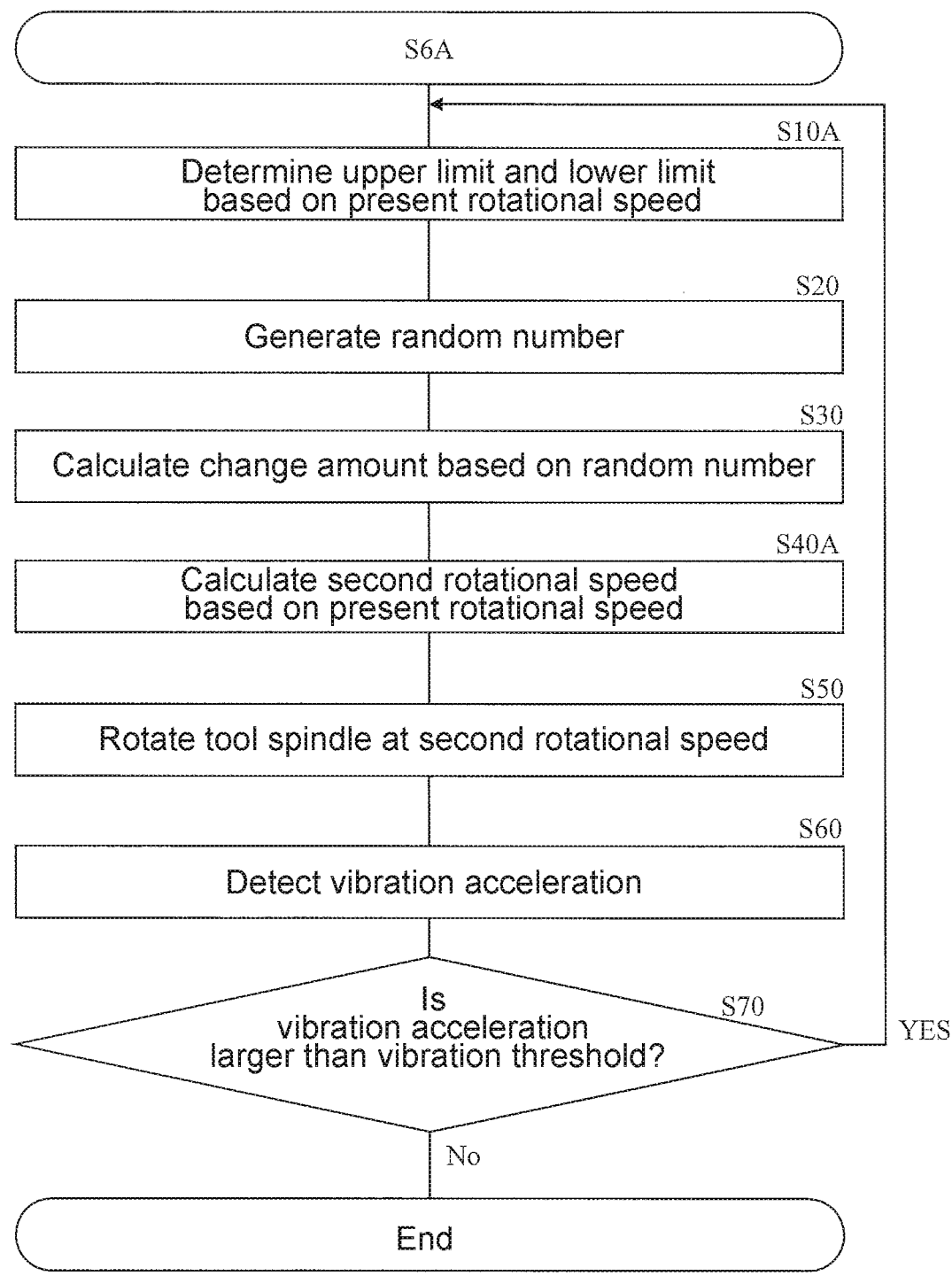
FIG. 5 is a flowchart of operations performed in the rotational-speed changing processing according to modification 1.

Next, FIG. 5 is a flowchart of operations performed in rotational-speed changing processing S6A, which is modification 1 of the rotational-speed changing processing S6 illustrated in FIG. 3. In the rotational-speed changing processing S6A according to modification 1, the rotational speed of the tool spindle 112 is repeatedly changed until the vibration acceleration A detected becomes equal to or less than a vibration threshold. Description of overlapping steps will be omitted.

Specifically, the rotational-speed changing processing S6A is different from the rotational-speed changing processing S6 illustrated in FIG. 3 in that step S10A is performed instead of step S10, step S40A is performed instead of step S40, and steps 60 and 70 are performed after step S50.

At step S10A, the setting circuit 40 sets a tolerable range VW of the change amount of the rotational speed of the tool spindle 112 based on the present rotational speed of the tool spindle 112. For example, the setting circuit 40 sets the tolerable range VW by reading, from the memory 60, a table on which a plurality of rotational speeds are correlated with a plurality of tolerable ranges. For further example, the setting circuit 40 sets the tolerable range VW based on a manipulation received at the manipulator 70. The tolerable range VW is set at, for example, 10% of the present rotational speed. The upper limit UL and the lower limit LL are set to satisfy the tolerable range VW.

Step S40A is different from step S40 in that the second rotational speed RS2 is calculated by changing the present rotational speed by the change amount V calculated at step S30 while satisfying the tolerable range VW obtained at step S10A.

When the first rotational speed RS1 has been changed to the second rotational speed RS2 (step 50), the vibration detection circuit 20 detects the vibration acceleration A (step S60). Then, the determination circuit 30 determines whether the vibration acceleration A detected at step S60 is larger than the vibration threshold (step S70). When the vibration acceleration A detected at step S60 is equal to or less than the vibration threshold (step S70: No), the rotational-speed changing processing S6A ends. It is to be noted that the determination circuit 30 may, at step S70, use the load on the tool spindle 112 in addition to the vibration acceleration A. When the vibration acceleration A detected at step S60 is larger than the vibration threshold (step S70: Yes), the procedure returns to step S10A. That is, steps S10A to S50 are repeated until the vibration acceleration A detected at step S60 becomes smaller than the vibration threshold.

In other words, second rotational speed RS20), which corresponds to the count, j, of changing of the rotational speed, is calculated based on the following Formulae 3-1 and 3-2.

$$V(j)=LL(j)+VW(j) \times RN(j) \qquad \text{(Formula 3-1)}$$

$$RS2(j)=RS2(j-1)+V(j) \qquad \text{(Formula 3-2)}$$

It is to be noted, however, that the lower limit LL(j) is an absolute value (rpm) of the rotational speed. Thus, the control circuit 10 calculates the new second rotational speed RS2(j) by changing the second rotational speed RS2(j−1) by the change amount V(j) alone. It is to be noted, however, that the second rotational speed RS2(0) is equal to the first rotational speed RS1. The second rotational speed RS2(j), therefore, can be calculated based on Formula 3-1 and the following Formula 3-3.

$$RS2(j) = RS1 + \sum_{k=1}^{j} V(k) \qquad \text{(Formula 3-3)}$$

Figure 6:
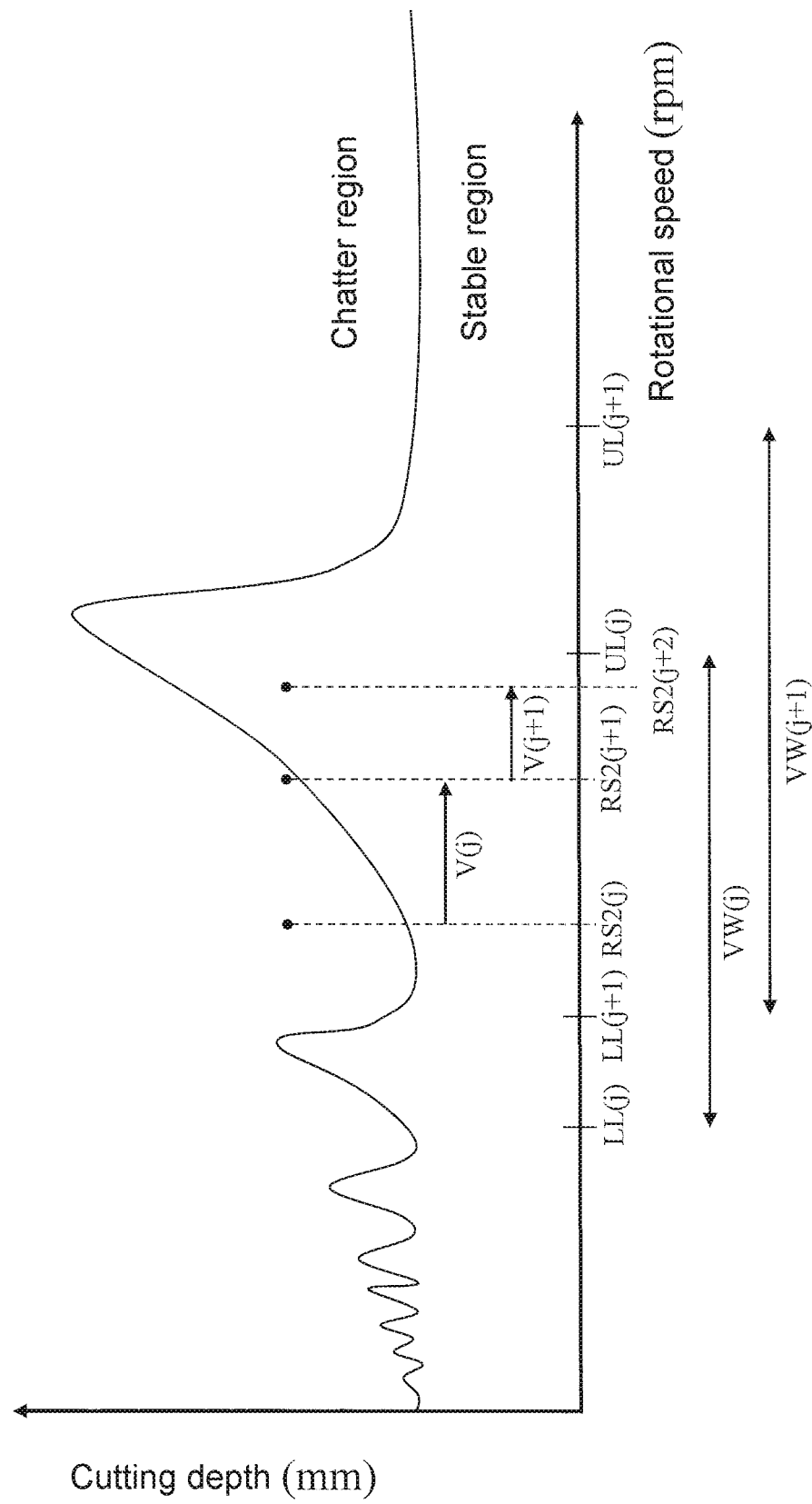
FIG. 6 is a schematic stability lobe diagram for showing effects of the rotational-speed changing processing according to modification 1.

FIG. 6 is a schematic stability lobe diagram for showing effects of the rotational-speed changing processing S6A according to modification 1. The lower half region defined by the lobe illustrated in FIG. 6 is a stable region in which machining can be performed without allowing chatter vibrations to occur, and the upper half region defined by the lobe is a chatter region in which chatter vibrations occur. The upper limit UL, the lower limit LL, and the change amount V are absolute values (rpm). As illustrated in FIG. 6, the tolerable range VW(j) changes depending on the count j of changing. That is, the upper limit UL(j) and the lower limit LL(j) change depending on the count j of changing. The change amount V(j) is determined based on the tolerable range VW(j) and the random number RN(j). The second rotational speed RS2(j+1) is the sum of the second rotational speed RS2(j) and the change amount V(j). The second rotational speed RS2(j+2) is the sum of the second rotational speed RS2(j+1) and the change amount V(j+1), and eliminates or minimizes chatter vibrations.

Thus, by repeating changing the rotational speed, the second rotational speed RS2 at which chatter vibrations are eliminated or minimized is obtained more reliably.

Also, the second rotational speed RS2 at which chatter vibrations are eliminated or minimized is obtained by random search based on the random number RN(j). This ensures that the second rotational speed RS2 at which chatter vibrations are eliminated or minimized is obtained comparatively stably, as compared with cases of linear search, which can fall into a state of ongoing inability to eliminate or minimize chatter vibrations.

Further, calculating the second rotational speed RS2(j) based on the random number RN(j) reduces the possibility of falling into a localized solution, as compared with an algorithm that changes the rotational speed to make the vibration acceleration A(j) smaller.

Referring to the stability lobe diagram illustrated in FIG. 6, the distance (rotational speed) between adjacent peaks increases as the rotational speed increases. That is, a larger change amount V is necessary as the rotational speed increases, in order to eliminate or minimize chatter vibrations. In light of this, enlarging the tolerable range VW(j) as the present rotational speed increases, as in step S10A, makes absolute values of the change amount V(j) larger. This enables the control circuit 10 to more quickly obtain the second rotational speed RS2, which eliminates or minimizes chatter vibrations.

In other words, as the rotational speed becomes lower, the chatter vibrations can be eliminated or minimized by a smaller change amount V. In light of this, making the tolerable range VW(j) a relative value relative to the present rotational speed, as in step S10A, makes the change amount V(j) smaller, together with the present rotational speed.

It is to be noted, however, that the tolerable range VW(j) may not necessarily a relative value (%) relative to the present rotational speed, but may be an absolute value (rpm) of the rotational speed.

Modification 2

Figure 7:
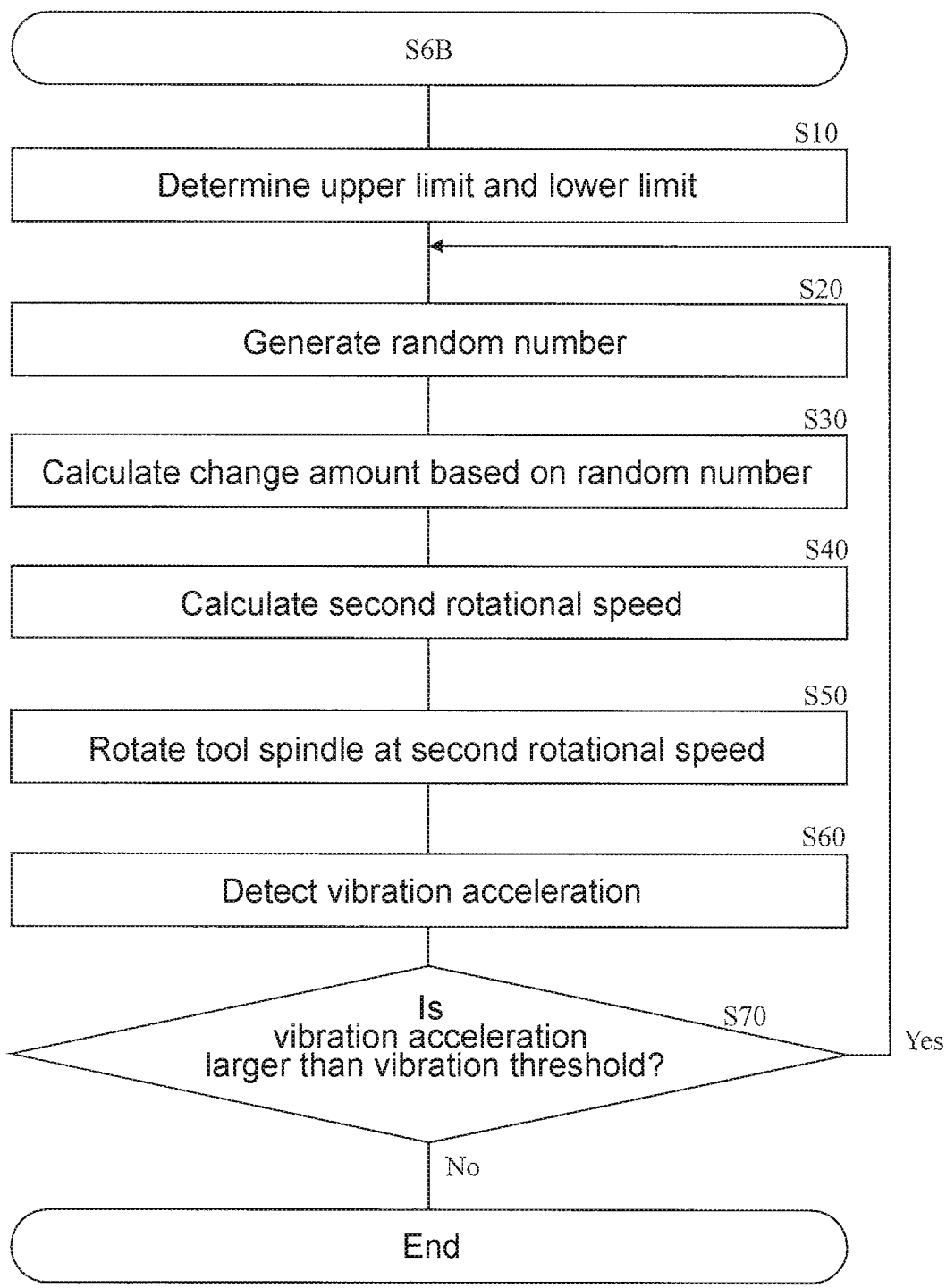
FIG. 7 is a flowchart of operations performed in the rotational-speed changing processing according to modification 2.

Next, FIG. 7 is a flowchart of operations performed in rotational-speed changing processing S6B of changing the rotational speed of the tool spindle 112, which is modification 2 of the rotational-speed changing processing S6 of changing the rotational speed of the tool spindle 112 illustrated in FIG. 3. In the rotational-speed changing processing S6B according to modification 2, the upper limit UL and the lower limit LL are fixed, and changing of the first rotational speed RS1 to the second rotational speed RS2 is repeated.

Specifically, the flowchart illustrated in FIG. 7 is different from the rotational-speed changing processing S6A according to modification 1 in that: step S10 is performed instead of step S10A; step S40 is performed instead of step S40A; and when the determination at step S70 is Yes, the procedure returns to step S20.

As illustrated in FIG. 7, the determination circuit 30 determines whether the vibration acceleration A detected at step S60 is larger than the vibration threshold (step S70). When the vibration acceleration A detected at step S60 is larger than the vibration threshold (step S70: Yes), the procedure returns to step S20. That is, step S10 is not repeated, and thus the upper limit UL and the lower limit LL are fixed values when the second rotational speed RS2 is repeatedly calculated. Under the circumstances, in the rotational-speed changing processing S6B, the tolerable range VW, which is the change amount of the first rotational speed RS1, is also a fixed value.

The control circuit 10 calculates the second rotational speed RS2(j) based on the following Formulae 4-1 and 4-2.

$$V(j)=LL+VW \times RN(j) \qquad \text{(Formula 4-1)}$$

$$RS2(j)=RS1+V(j) \qquad \text{(Formula 4-2)}$$

That is, the change amount V(j) is determined randomly from the fixed range between the fixed upper limit UL and the fixed lower limit LL based on the random number RN(j). The second rotational speed RS2(j) is the sum of the first rotational speed RS1 and the change amount V(j). It is to be noted, however, that the change amount V(j) may not necessarily be an absolute value (rpm) of the rotational speed, but may be a relative value (%) relative to the rotational speed.

Thus, the second rotational speed RS2 is changed within a fixed range. This ensures that the second rotational speed RS2 at which chatter vibrations are eliminated or minimized is determined as a speed that is not far from the originally specified first rotational speed RS1. This makes it easier to avoid such situations involved in eliminating or minimizing chatter vibrations as: an increase in the load on the machine tool 100; a shortened tool life; and an unexpectedly elongated extension of the machining time.

Modification 3

Figure 8:
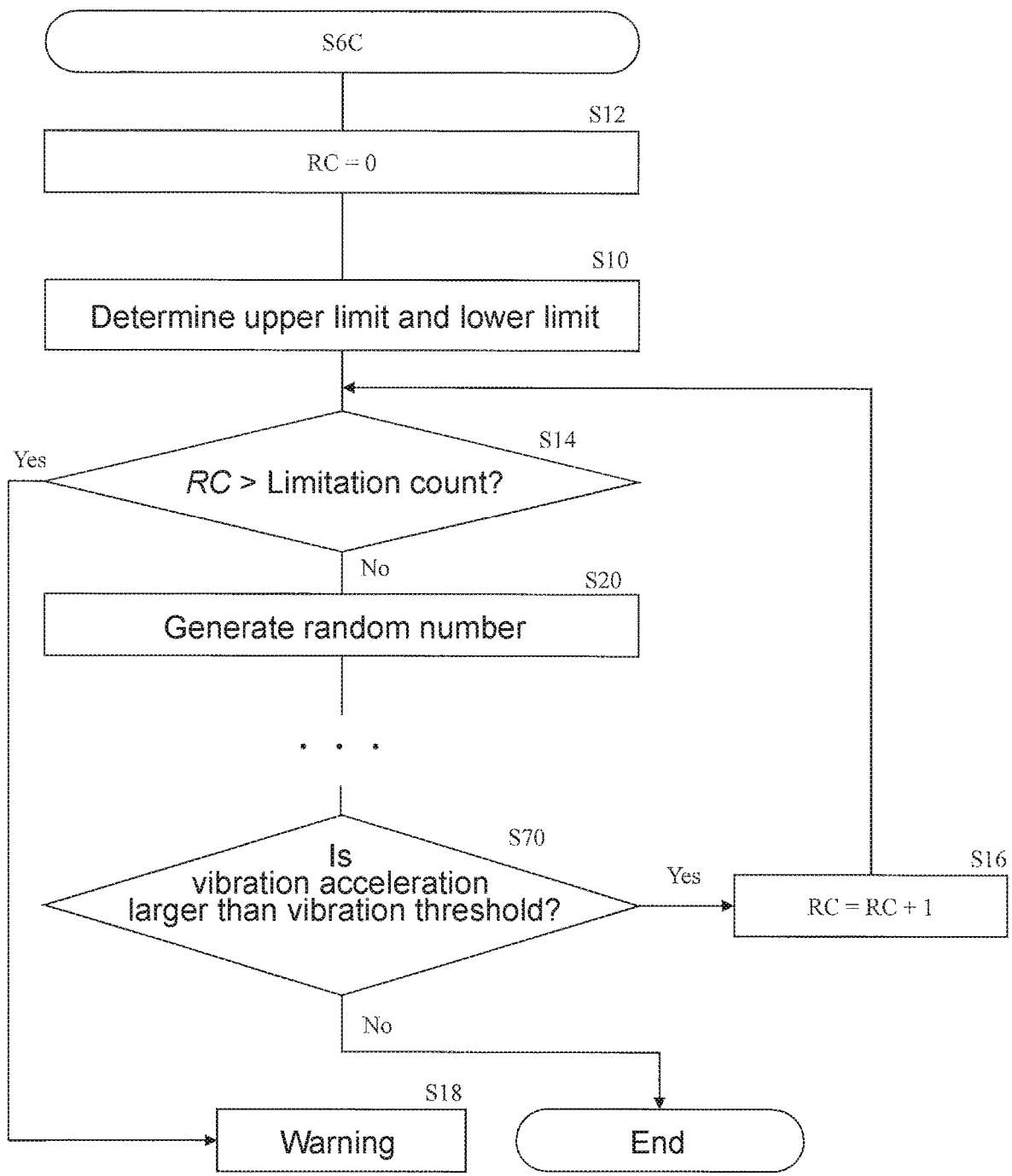
FIG. 8 is a flowchart of operations performed in the rotational-speed changing processing according to modification 3.

Next, FIG. 8 is a flowchart of operations performed in rotational-speed changing processing S6C, which is modification 3 of the rotational-speed changing processing S6 illustrated in FIG. 3. The rotational-speed changing processing S6C according to modification 3 is different from the rotational-speed changing processing S6B according to modification 1 in that the repetition count of changing of the rotational speed is restricted. Description of overlapping steps will be omitted.

As illustrated in FIG. 8, the control circuit 10 inputs 0 into the repetition count, RC, (step S12). This repetition count RC is temporarily stored in, for example, the memory 60. Then, when the setting circuit 40 has set the upper limit UL and the lower limit LL (step S10), the control circuit 10 determines whether the repetition count RC is in excess of a limitation count (step S14). When the repetition count RC is not in excess of the limitation count (step S14: No), the procedure proceeds to step S20. When the vibration acceleration detected at step S60 is larger than the vibration threshold (step S70: Yes), the control circuit 10 increases the repetition count RC by one (step S16). When the repetition count RC is increased by one (step S16), the procedure returns to step S14.

When the repetition count RC is in excess of the limitation count (step S14: Yes), the control circuit 10 makes a warning (step S18). For example, the control circuit 10 displays a warning content on the display 80, and ends the processing of changing the rotational speed of the tool spindle 112 (step S18). Thus, the repetition count RC of changing of the rotational speed is restricted. This eliminates or minimizes never-endingness of the processing of searching for the second rotational speed RS2, which eliminates or minimizes chatter vibrations.

For example, the control circuit 10 may temporarily record the vibration acceleration that has been detected in the memory 60 in such a manner that the vibration acceleration is related to the rotational speed at the time of detection. Then, the control circuit 10 may, at step S18, display on the display 80 the rotational speed at the time of detection of the lowest value of the vibration acceleration detected in the changing processing. Further, the control circuit 10 may display on the display 80 the rotational speed at the time of detection of the lowest value and the vibration acceleration corresponding to this rotational speed. Further, the control circuit 10 may change the rotational speed to a rotational speed at the time of detection of the lowest vibration acceleration in the changing processing. This ensures that chatter vibrations occurrable while the machine tool 100 is performing cutting are eliminated or minimized prior to the rotational-speed changing processing.

Modification 4

Figure 9:
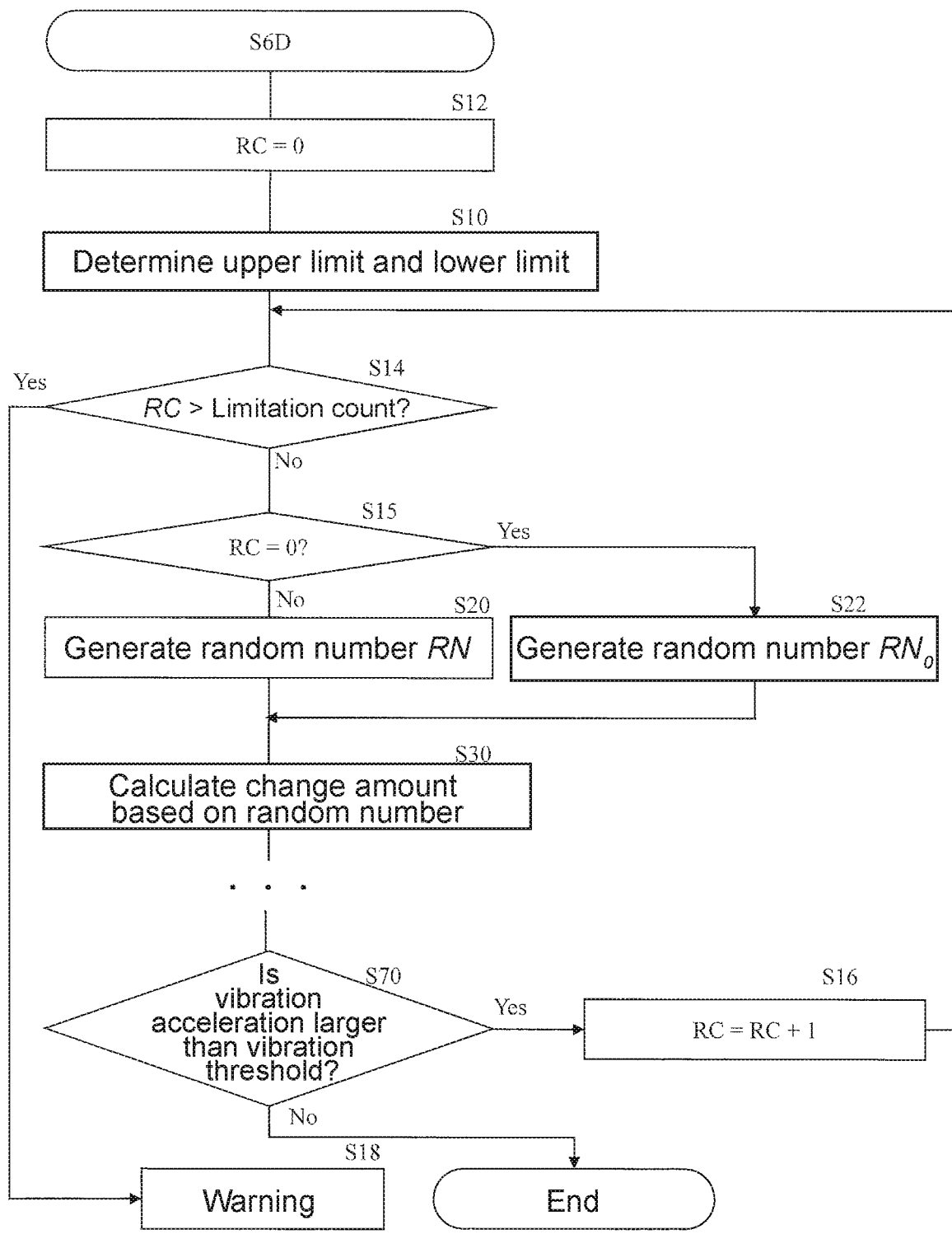
FIG. 9 is a flowchart of operations performed in the rotational-speed changing processing according to modification 4.

Next, FIG. 9 is a flowchart of operations performed in rotational-speed changing processing S6D, which is modification 4 of the rotational-speed changing processing S6 illustrated in FIG. 3. The rotational-speed changing processing S6D according to modification 4 is different from the rotational-speed changing processing S6C according to modification 3 in that when the rotational speed is changed for the first time, the change amount V is determined from the range between the upper limit UL and the lower limit LL such that the second rotational speed RS2 is larger than the first rotational speed RS1. Description of overlapping steps will be omitted.

When the repetition count RC is not in excess of the limitation count (step S14: No), the control circuit 10 determines whether the repetition count RC is 0 (step S15). When the repetition count RC is not 0 (step S15: No), the procedure proceeds to step S20. When the repetition count RC is 0 (step S15: Yes), the procedure proceeds to step S22.

The random number generation circuit 10R of the control circuit 10 generates a random number $RN_0$ such that the second rotational speed RS2 is larger than the first rotational speed RS1 (step S22). For example, when: the upper limit UL is 100 (rpm); the lower limit LL is −100 (rpm); and the random number $RN_0$ that has been generated is equal to or less than 0.5, then the random number generation circuit 10R increases the random number $RN_0$ by 0.5. This ensures that even if the lower limit LL is −100 (rpm), the change amount V is larger than 0 (rpm).

Thus, when the rotational speed is changed for the first time, the second rotational speed RS2 is larger than the first rotational speed RS1. This reduces the possibility of obtaining, as the second rotational speed RS2, a rotational speed smaller than the first rotational speed RS1, when chatter vibrations can be eliminated or minimized using a rotational speed smaller than the first rotational speed RS1. In other words, the rotational-speed changing processing S6D according to this modification increases the possibility of calculating a larger rotational speed as the second rotational speed RS2, in order to eliminate or minimize chatter vibrations and shorten the cutting time.

In this modification, the random number generation circuit 10R generates the random number $RN_0$ to make the second rotational speed RS2 larger than the first rotational speed RS1. It is also possible, however, for the control circuit 10 to change the method of calculating the change amount V, instead of generating the random number $RN_0$, in order to make the second rotational speed RS2 larger than the first rotational speed RS1. For example, it is possible to convert a negative change amount V into a positive change amount V. For further example, it is possible to, instead of converting the change amount V, set a lower limit LL(0), which is a lower limit at the time when the repetition count RC is 0, at a positive value.

Modification 5

Figure 10:
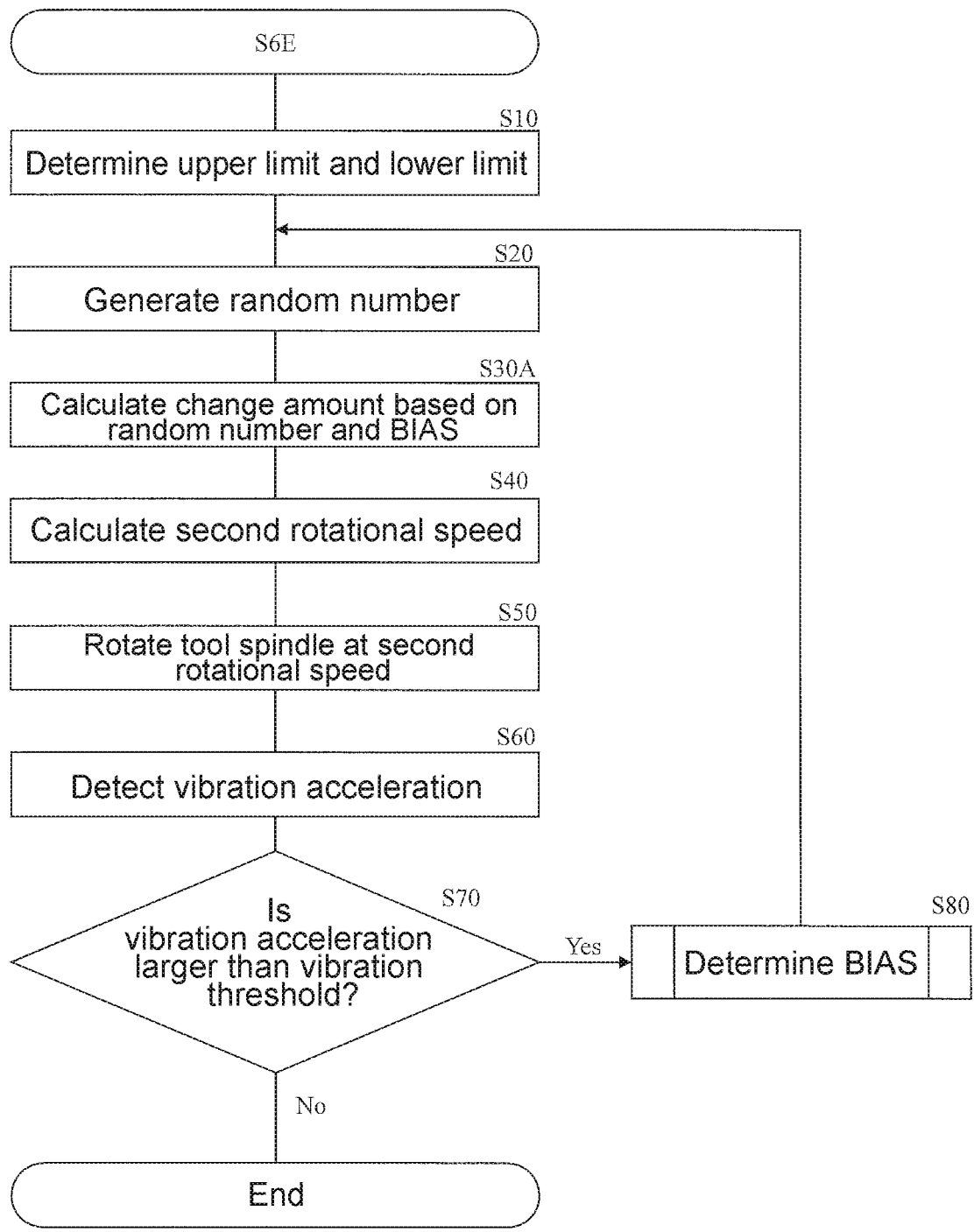
FIG. 10 is a flowchart of operations performed in the rotational-speed changing processing according to modification 5.

Next, FIG. 10 is a flowchart of operations performed in rotational-speed changing processing S6E, which is modification 5 of the rotational-speed changing processing S6 illustrated in FIG. 3.

The rotational-speed changing processing S6E according to modification 5 is different from the rotational-speed changing processing S6B according to modification 1 in that when the vibration acceleration A(j) is smaller than the vibration acceleration A(j−1), the change amount V(j+1) is determined such that a large-small relationship between the second rotational speed RS2(j) and the second rotational speed RS2(j−1) is maintained. Description of overlapping steps will be omitted.

Specifically, as illustrated in FIG. 10, the rotational-speed changing processing S6E is different from rotational-speed changing processing S6B in that: step S30A is performed instead of step S30; when the determination at step S70 is Yes, step S80 is performed; and after step S80 is performed, the procedure returns to step S20.

At step S30A, the control circuit 10 calculates the change amount V based on the following Formulae 3-1A and 3-2.

$$V(j)=\text{Bias}\cdot(LL(j)+VW(j)\times RN(j)) \quad \text{(Formula 3-1A)}$$

$$RS2(j)=RS2(j-1)+V(j) \quad \text{(Formula 3-2)}$$

Figure 11:
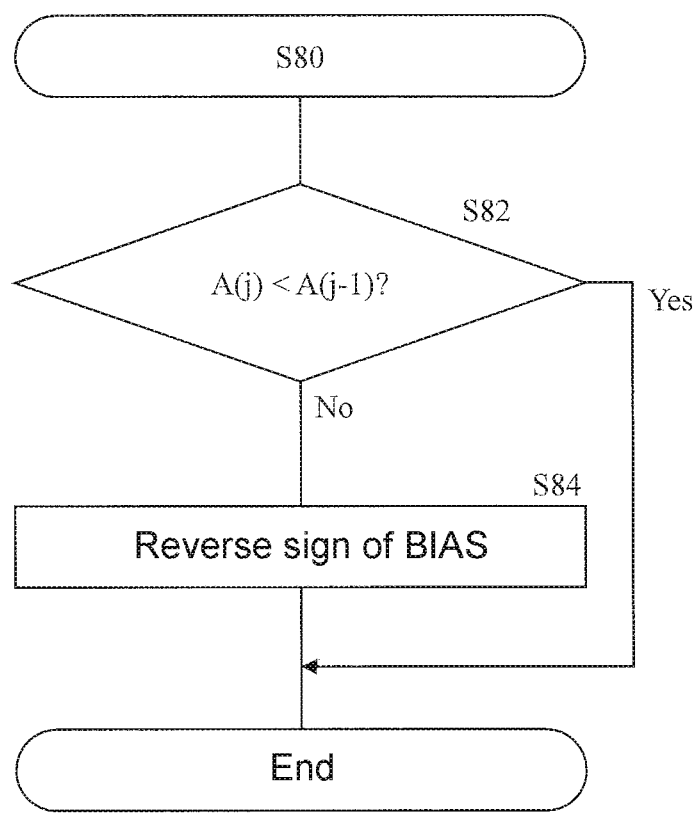
FIG. 11 is a flowchart of operations of Bias determination processing.

It is to be noted, however, that in this modification, the upper limit UL(j) and the lower limit LL(j) are determined such that VW(j) is a positive value. Also, Bias is −1 or +1. Bias is temporarily stored in, for example, the memory 60. The Bias is determined at step S80. Specifically, as illustrated in FIG. 11, the control circuit 10 determines whether the vibration acceleration A(j) is smaller than the vibration acceleration A(j−1) (step S82). When the vibration acceleration A(j) is smaller than the vibration acceleration A(j−1) (step S82: Yes), the control circuit 10 ends the processing at step S80. That is, when the vibration acceleration A(j) is smaller than the vibration acceleration A(j−1) (step S82: Yes), the sign of the Bias is not changed. When the vibration acceleration A(j) is equal to or more than the vibration acceleration A(j−1) (step S82: No), the control circuit 10 reverses the sign of the Bias (step S84).

It is to be noted, however, that the vibration acceleration A detected at step S4 (see FIG. 2) and step S60 is assumed to be temporarily stored in the memory 60.

For example, when the second rotational speed RS2(j−1) is larger than the second rotational speed RS2(j−1) and when the vibration acceleration A(j) is smaller than the vibration acceleration A(j−1), the sign of the Bias remains unchanged. Therefore, the change amount V(j) is a positive value. As a result, the second rotational speed RS2(j+1) is larger than the second rotational speed RS2(j). Also, when the second rotational speed RS26) is larger than the second rotational speed RS2(j−1) and when the vibration acceleration A(j) is equal to or more than the vibration acceleration A(j−1), the sign of the Bias is reversed. Therefore, the change amount V(j) is a negative value. As a result, the second rotational speed RS2(j+1) is smaller than the second rotational speed RS2(j). That is, when the vibration acceleration A becomes smaller, the control circuit 10 maintains the direction of changing of the rotational speed (high rotational speed or low rotational speed), while when the vibration acceleration A does not become smaller, the control circuit 10 reverses the direction of changing of the rotational speed. This ensures that the second rotational speed RS2 at which chatter vibrations are eliminated or minimized is obtained more quickly. It is to be noted that the change amount V(j) may be a relative value (%) relative to the rotational speed.

While in this modification the Bias is a value of −1 or +1, this is not intended in a limiting sense. For example, the Bias may be a flag indicating whether the switching of the direction of changing of the rotational speed should be made effective, and the flag may be stored in the memory 60. By referring to the flag, the control circuit 10 may determine whether to add or subtract the change amount V(j) to or from the present rotational speed.

Modification 6

Figure 12:
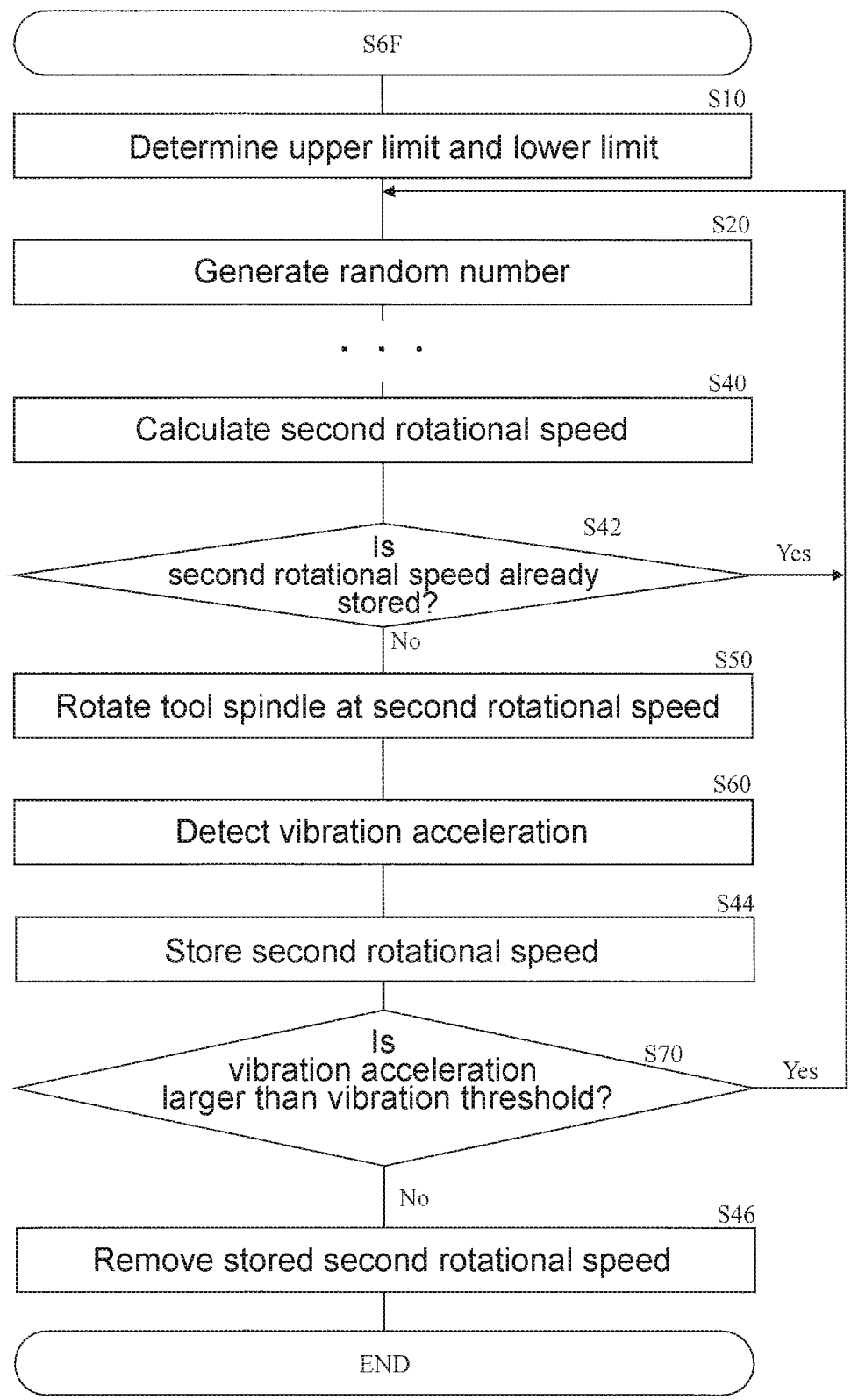
FIG. 12 is a flowchart of operations performed in the rotational-speed changing processing according to modification 6.

Next, FIG. 12 is a flowchart of operations performed in rotational-speed changing processing S6F of changing the rotational speed of the tool spindle 112, which is modification 6 of the rotational-speed changing processing S6 of changing the rotational speed of the tool spindle 112 illustrated in FIG. 3. The rotational-speed changing processing S6F according to modification 6 of changing the rotational speed of the tool spindle 112 is different from the rotational-speed changing processing S6B according to modification 1 in that once a second rotational speed RS2 is used, the second rotational speed RS2 is not calculated again. Description of overlapping steps will be omitted.

Figure 13:
FIG. 13 illustrates a used list stored in a memory.

As illustrated in FIG. 12, in the rotational-speed changing processing S6F according to modification 6, when the second rotational speed RS2 has been calculated (step S40), the control circuit 10 determines whether the second rotational speed RS2 that has been calculated is stored in the memory 60 (step S42). When the second rotational speed RS2 that has been calculated is stored in the memory 60 (step S42: Yes), the control circuit 10 returns to step S20. That is, the control circuit 10 does not rotate the tool spindle 112 at the second rotational speed RS2 already stored in the memory 60. When the second rotational speed RS2 that has been calculated is not stored in the memory 60 (step S42: No), steps S50 and S60 are performed. After step S60 is performed, the control circuit 10 stores, in the memory 60, the second rotational speed RS2 that has been calculated (step S44). For example, as illustrated in FIG. 13, the memory 60 stores a used list 600. The used list 600 stores the second rotational speed RS2 calculated at step S40 in correlation with the vibration acceleration A detected at step S60. It is to be noted, however, that the used list 600 may store the second rotational speed RS2 alone. It is also to be noted that the used list 600 may store the change amount V instead of the second rotational speed RS2.

When the vibration acceleration A that has been detected is equal to or less than the vibration threshold (step S70: No), the control circuit 10 removes the second rotational speed RS2 from the memory 60 (step S46). Specifically, once chatter vibrations have been eliminated or minimized, the used list 600, which is stored in the memory 60, is initialized. Then, the rotational-speed changing processing S6F ends.

In the rotational-speed changing processing S6F according to modification 6, a second rotational speed RS2 at which chatter vibrations can not be eliminated or minimized is not used more than once to rotate the tool spindle 112. This configuration ensures that the second rotational speed RS2 at which chatter vibrations are eliminated or minimized is obtained more quickly. The above configuration also reduces the possibility of falling into a localized solution, as compared with, for example, an algorithm such as hill climbing method.

It is to be noted that features of the above-described modifications 1 to 6 may be combined with each other insofar as the combined features do not contradict each other. For example, the control circuit 10 may use the Bias, the repetition count RC, and the used list 600 to more quickly obtain the second rotational speed RC2 at which chatter vibrations are eliminated or minimized.

Second Embodiment

Figure 14:
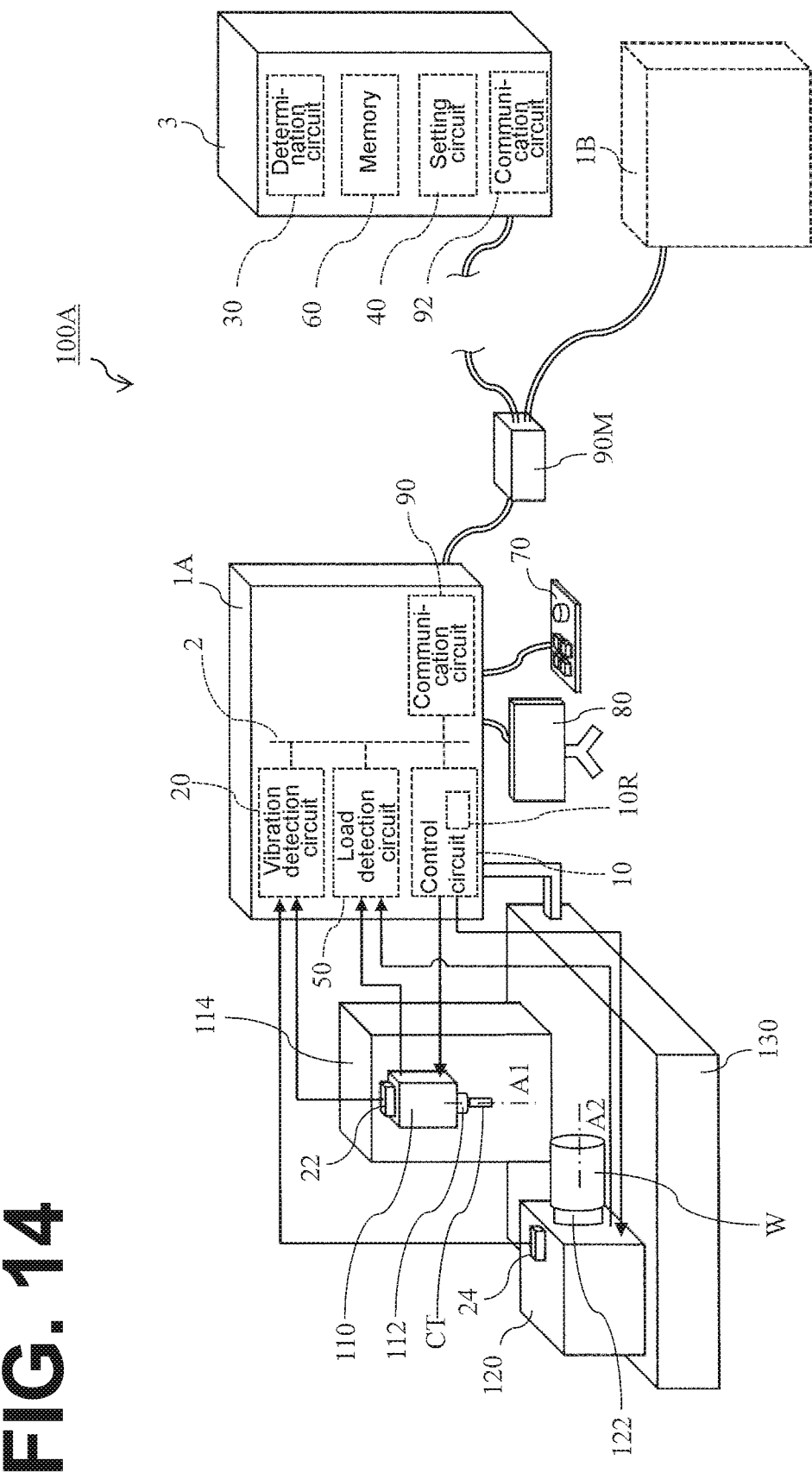
FIG. 14 illustrates a schematic configuration of a machine tool according to a second embodiment.

Next, FIG. 14 illustrates a schematic configuration of a machine tool 100A according to the second embodiment.

The machine tool 100A according to the second embodiment is different from the machine tool 100 according to the first embodiment in that the machine tool 100A includes a controller 1A and a central processing unit 3.

The central processing unit 3 is connected to the controller 1A via a communication device 90M. This enables the central processing unit 3 and the controller 1A to communicate with each other. The central processing unit 3 is also capable of communicating with a controller other than the controller 1A, namely, a controller 1B for the machine tool. In order to communicate with the central processing unit 3, the controller 1A includes a communication circuit (first communication means) 90. The communication circuit 90 is connected to the control circuit 10, the vibration detection circuit 20, and the load detection circuit 50 via the bus 2.

In the machine tool 100A according to the second embodiment, the determination circuit 30, the setting circuit 40, and the memory 60 are provided in the central processing unit 3. In order to communicate with the communication circuit 90, the central processing unit 3 includes a communication circuit (second communication means) 92.

Thus, the configuration of the controller 1 according to the first embodiment may be applied to other apparatus or device than the controller 1, in which case as well, the advantageous effects of the first embodiment and modifications 1 to 6 are obtained. Further, the configuration of the central processing unit 3 may be implemented by cloud computing. It is to be noted that the control circuit 10 may not necessarily be provided in the controller 1A.

Figure 15:
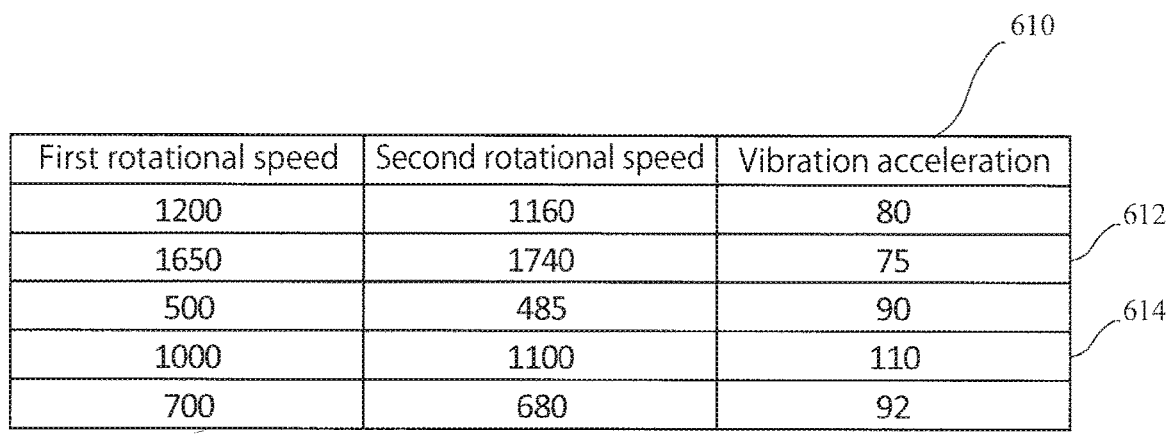
FIG. 15 illustrates a result list stored in the memory.

Also, the memory 60 of the central processing unit 3 may store the first rotational speed RS1 in correlation with the second rotational speed RS2 at which chatter vibrations are eliminated or minimized. This enables the controller 1B, which is other than the controller 1A, to read the first rotational speed RS1 and the second rotational speed RS2 at which chatter vibrations are eliminated or minimized. For example, as illustrated in FIG. 15, the memory 60 stores a result list 610, which shows results of the rotational-speed changing processing. In data 612 of the result list 610, a first rotational speed RS1 of 1650 (rpm) is correlated with: a second rotational speed RS2 of 1740 (rpm), at which chatter vibrations are eliminated or minimized; and a vibration acceleration A of 75 (m/s$^2$), which is detected at the time when the chatter vibrations are eliminated or minimized.

The result list 610 may store not only a second rotational speed RS2 at which chatter vibrations are eliminated or minimized but also a second rotational speed RS2 at which chatter vibrations can not be eliminated or minimized. In data 614 of the result list 610, a first rotational speed RS1 of 1000 (rpm) is correlated with: a second rotational speed RS2 of 1100 (rpm), at which chatter vibrations can not be eliminated or minimized; and a vibration acceleration A of 110 (m/s$^2$), which is detected at the time when the tool spindle 112 is rotating at the second rotational speed RS2. It is to be noted, however, that the vibration threshold is 100 (m/s$^2$).

Thus, results of rotational-speed changing processing accumulate in the memory 60. This not only enables the controller 1B, which is other than the controller 1A, to read the results of the rotational-speed changing processing but also enables the controller 1A to read the results. This ensures that when the controller 1A starts new cutting, the controller 1A is able to, without changing the rotational speed frequently, obtain the second rotational speed RS2 at which chatter vibrations are eliminated or minimized. In this respect, the controller 1A may obtain a second rotational speed RS2 corresponding to the smallest vibration acceleration.

Further, as shown in a result list 620 in FIG. 16, the memory 60 may store cutting tool, feed rate of the tool spindle 112, cutting depth, and workpiece material, in correlation with each other. Also, the data stored in the result list 620 may be correlated with cutting machining programs.

The control circuit 10 may, instead of changing the rotational speed automatically, display the result list 620 on the display 80 and make a user select a second rotational speed RS2.

Other Embodiments

In the above-described examples, the tool spindle 112 is substantially parallel to vertical directions. The tool spindle 112, however, may be inclined relative to vertical directions or may be substantially parallel to horizontal directions. Also, the machine tool 100 may include a tool automatic exchanger that automatically exchanges the cutting tool CT. The cutting tool CT may be exchanged using a turret.

Also in the above-described examples, milling is performed using the cutting tool CT. The milling may be end milling or milling. Also, the cutting will not be limited to milling but may be turning (outer diameter/inner diameter/end surface/boring).

Also in the above-described examples, various thresholds and values can be set via the manipulator 70. It is also possible, however, that various thresholds and values are set by receiving setting signals via the communication circuit 90.

Also, the upper limit UL, the lower limit LL, the tolerable range VW, the limitation count of the repetition count RC, and the Bias may be set for an individual cutting tool CT, an individual workpiece material, and an individual cutting machining program.

Also, the order in which the steps in each of the above-described flowcharts are performed may be changed insofar as the results of the processings do not differ.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Obviously, numerous modifications and variations of the present invention are possible in light of the above teachings. It is therefore to be understood that within the scope of the appended claims, the present invention may be practiced otherwise than as specifically described herein.

What is claimed is:

1. A controller for a machine tool, the controller comprising:
    determination means for determining whether a chatter vibration is occurring while a spindle on which a cutting tool or a workpiece is mounted is rotating and the workpiece is being cut;
    setting means for setting an upper limit and a lower limit on a change amount of a rotational speed of the spindle; and
    control means for controlling the rotational speed of the spindle, the control means being configured to determine the change amount randomly from a range between the upper limit and the lower limit and configured to rotate the spindle at a second rotational speed obtained by changing a first rotational speed by the change amount that has been determined if the chatter vibration is determined as occurring while the control means controls the rotational speed of the spindle at the first rotational speed, the control means being configured to repeatedly change the rotational speed until the chatter vibration is determined as not occurring.

2. The controller according to claim 1, wherein the control means is configured to generate a random number and determine the change amount based on the random number.

3. The controller according to claim 1, further comprising storing means,
    wherein the control means is configured to calculate the second rotational speed based on the first rotational speed and the change amount, the control means being configured to not use the second rotational speed calculated by the control means if the second rotational speed calculated by the control means is the same as one of at least one rotational speed stored in the storing means.

4. The controller according to claim 1, wherein the setting means is configured to enlarge the range as the first rotational speed increases.

5. The controller according to claim 1, further comprising vibration detection means for detecting a vibration acceleration of a vibration occurrable when the workpiece is cut,
    wherein the determination means is configured to determine that the chatter vibration is occurring if the vibration acceleration is larger than a threshold.

6. The controller according to claim 5, wherein if the vibration acceleration detected while the spindle is rotating at the second rotational speed in a post-change state is smaller than the vibration acceleration detected while the spindle is rotating at the second rotational speed in a pre-change state, the control means is configured to randomly determine the change amount from the range such that a large-small relationship between the second rotational speed in the post-change state and the second rotational speed in the pre-change state is maintained.

7. The controller according to claim 5, further comprising load detection means for detecting a load on the spindle,
    wherein the threshold corresponds to the load.

8. A machine tool comprising:
    a spindle; and
    the controller according to claim 1.

9. A controller for a machine tool, the controller comprising:
    a determination circuit configured to determine whether a chatter vibration is occurring while a spindle on which a cutting tool or a workpiece is mounted is rotating and the workpiece is being cut;
    a setting circuit configured to set an upper limit and a lower limit on a change amount of a rotational speed of the spindle; and
    a control circuit configured to control the rotational speed of the spindle, the control circuit being configured to determine the change amount randomly from a range between the upper limit and the lower limit and configured to rotate the spindle at a second rotational speed obtained by changing a first rotational speed by the change amount that has been determined if the determination circuit determines that the chatter vibration is occurring while the control circuit controls the rotational speed of the spindle at the first rotational speed, the control circuit being configured to repeatedly change the rotational speed until the chatter vibration is determined as not occurring.

10. The controller according to claim 9, wherein the control circuit is configured to generate a random number and determine the change amount based on the random number.

11. The controller according to claim 9, further comprising a storing circuit,
    wherein the control circuit is configured to calculate the second rotational speed based on the first rotational speed and the change amount, the control circuit being configured to not use the second rotational speed calculated by the control circuit if the second rotational speed calculated by the control circuit is the same as one of at least one rotational speed stored in the storing circuit.

12. The controller according to claim 9, wherein the setting circuit is configured to enlarge the range as the first rotational speed increases.

13. The controller according to claim 9, wherein if the control circuit determines the change amount for a first time, the control circuit is configured to determine the change amount from the range such that the second rotational speed is higher than the first rotational speed.

14. The controller according to claim 9, wherein the control circuit is configured to change the rotational speed such that a repetition count of changing of the rotational speed is at or below a limitation count.

15. The controller according to claim 9, further comprising a vibration detection circuit configured to detect a vibration acceleration of a vibration occurrable when the workpiece is cut,
    wherein the determination circuit is configured to determine that the chatter vibration is occurring if the vibration acceleration is larger than a threshold.

16. The controller according to claim 15, wherein if the vibration acceleration detected while the spindle is rotating at the second rotational speed in a post-change state is smaller than the vibration acceleration detected while the spindle is rotating at the second rotational speed in a pre-change state, the control circuit is configured to randomly determine the change amount from the range such that a large-small relationship between the second rotational speed in the post-change state and the second rotational speed in the pre-change state is maintained.

17. The controller according to claim 15, further comprising a load detection circuit configured to detect a load on the spindle, wherein the threshold corresponds to the load.

18. The controller according to claim 9, wherein the upper limit and the lower limit are absolute values of the rotational speed.

19. The controller according to claim 9, wherein the upper limit and the lower limit are relative values relative to the rotational speed.

20. A method for controlling a machine tool, the method comprising:

rotating, at a first rotational speed, a spindle on which a cutting tool or a workpiece is mounted;

determining whether a chatter vibration is occurring while the spindle is rotating and the workpiece is being cut;

setting an upper limit and a lower limit on a change amount of a rotational speed of the spindle;

if the chatter vibration is determined as occurring while the spindle is rotating at the first rotational speed, determining the change amount randomly from a range between the upper limit and the lower limit;

rotating the spindle at a second rotational speed obtained by changing the first rotational speed by the change amount that has been determined; and changing repeatedly the rotational speed until the chatter vibration is determined as not occurring.

\* \* \* \* \*